(12) United States Patent
Lee

(10) Patent No.: US 9,776,689 B2
(45) Date of Patent: Oct. 3, 2017

(54) METHOD AND SYSTEM FOR STATIC AND DYNAMIC POSITIONING OR CONTROLLING MOTION OF MARINE STRUCTURE

(71) Applicant: CYTRONIQ., LTD., Cheonan, Chungcheongnam-Do (KR)

(72) Inventor: Michael Myungsub Lee, Seoul (KR)

(73) Assignee: CYTRONIQ., LTD., Cheonan, Chungcheongnam-Do (KR)

(*) Notice: Subject to any disclaimer, the term of this patent is extended or adjusted under 35 U.S.C. 154(b) by 484 days.

(21) Appl. No.: 14/510,552

(22) Filed: Oct. 9, 2014

(65) Prior Publication Data

US 2015/0246711 A1 Sep. 3, 2015

Related U.S. Application Data

(63) Continuation of application No. PCT/KR2013/002972, filed on Apr. 9, 2013.

(30) Foreign Application Priority Data

Apr. 9, 2012 (KR) .................. 10-2012-0036946
Apr. 9, 2012 (KR) .................. 10-2012-0036947
(Continued)

(51) Int. Cl.
*B63B 21/50* (2006.01)
*B63B 35/44* (2006.01)
(Continued)

(52) U.S. Cl.
CPC ............. *B63B 21/50* (2013.01); *B63B 35/44* (2013.01); *B63B 39/00* (2013.01); *B63B 43/06* (2013.01);
(Continued)

(58) Field of Classification Search
CPC ..... B63B 21/16; B63B 2708/02; B63B 21/50; B63B 35/44; B63B 43/06; B63B 39/00; G01L 1/246; G05D 1/0208
See application file for complete search history.

(56) References Cited

U.S. PATENT DOCUMENTS 6,173,207 B1 * 1/2001 Eidson ................. G05B 19/042
700/14
6,182,592 B1 * 2/2001 Molz ....................... B63B 21/16
114/230.2
(Continued)

FOREIGN PATENT DOCUMENTS

JP       2001-001980 A    1/2001
KR   10-2008-0031566 A    4/2008
(Continued)

OTHER PUBLICATIONS https://webbeta.archive.org/web/20100512172845/http://www.mdl.co.uk:80/).*

*Primary Examiner* — Thomas G Black
*Assistant Examiner* — Peter D Nolan
(74) *Attorney, Agent, or Firm* — Mintz Levin Cohn Ferris Glovsky and Popeo, P.C.; Kongsik Kim; Jonathon Western

(57) ABSTRACT

Disclosed is a system and method for static and dynamic positioning or motion control of a marine structure by using real-time monitoring of at least one of a mooring line, marine environments, 6-dof movement of a marine structure, a tank state, a ship topside, the seabed, or their combinations. The static and dynamic real-time monitoring data of the mooring line is obtained and processed for positioning the marine structure or controlling and managing a motion thereof. Here, 1) a tension of a mooring line is measured by means of real-time monitoring of the mooring line, 2) various marine environment elements such as wind (Continued)

direction, wind speed, air humidity, atmospheric pressure, atmosphere temperature, cloud height, visibility, ocean wave, wave height, sea current speed, sea current direction, rain or the like are measured by means of real-time monitoring of the marine environments, 3) 6-dof movement of the marine structure is measured by means of real-time monitoring of the marine structure, 4) ullage and sloshing data of various tanks in the marine structure are measured by means of real-time monitoring of tank states, 5) damage and life of pipes, facilities or the like located at a ship topside of the marine structure are measured by means of real-time monitoring of the ship topside, 6) damage and life of umbilical cables, pipes, pumps and valves located on the seabed are measured by means of real-time monitoring of the seabed, and suitable static and dynamic positioning or motion control and management may be automatically performed based thereon.

19 Claims, 19 Drawing Sheets

(30) Foreign Application Priority Data

| Apr. 9, 2012 | (KR) | 10-2012-0036948 |
| Apr. 9, 2012 | (KR) | 10-2012-0036949 |
| Apr. 9, 2012 | (KR) | 10-2012-0036950 |
| Apr. 9, 2012 | (KR) | 10-2012-0036951 |

(51) Int. Cl.
*B63B 43/06* (2006.01)
*E21B 41/00* (2006.01)
*B63H 25/00* (2006.01)
*B63B 39/00* (2006.01)
*G01L 1/24* (2006.01)
*G05D 1/02* (2006.01)
*B63B 21/16* (2006.01)

(52) U.S. Cl.
CPC ............ *B63H 25/00* (2013.01); *E21B 41/00* (2013.01); *G01L 1/246* (2013.01); *G05D 1/0208* (2013.01); *B63B 21/16* (2013.01); *B63B 2702/02* (2013.01)

(56) References Cited

U.S. PATENT DOCUMENTS

| 9,315,239 | B2* | 4/2016 | Gill | B63B 21/20 |
| 2005/0146706 | A1* | 7/2005 | Kameyama | G01S 17/58 |
| | | | | 356/28 |
| 2010/0116191 | A1* | 5/2010 | Holmberg | B66D 1/505 |
| | | | | 114/230.21 |
| 2011/0271891 | A1* | 11/2011 | Holmberg | B66D 1/505 |
| | | | | 114/230.1 |
| 2012/0111255 | A1* | 5/2012 | Fenini | B63B 21/16 |
| | | | | 114/230.22 |
| 2013/0018620 | A1* | 1/2013 | Riendeau | G01M 5/00 |
| | | | | 702/89 |
| 2014/0338581 | A1* | 11/2014 | Gill | B63B 21/04 |
| | | | | 114/230.21 |
| 2015/0344110 | A1* | 12/2015 | van der Tempel | B63B 27/14 |
| | | | | 114/230.2 |

FOREIGN PATENT DOCUMENTS

| KR | 10-2011-0064355 A | 6/2011 |
| KR | 10-2011-0115395 A | 10/2011 |

* cited by examiner

METHOD AND SYSTEM FOR STATIC AND DYNAMIC POSITIONING OR CONTROLLING MOTION OF MARINE STRUCTURE

CROSS-REFERENCE TO RELATED APPLICATIONS

This is a continuation of International Application No. PCT/KR2013/002972 filed on Apr. 9, 2013, which claims priority to Korean Application Nos. 10-2012-0036946, 10-2012-0036947, 10-2012-0036948, 10-2012-0036949, 10-2012-0036950, and 10-2012-0036951 filed on Apr. 9, 2012. The applications are incorporated herein by reference.

TECHNICAL FIELD

The present disclosure relates to a system and method for static and dynamic positioning or motion control of a marine structure, and more particularly, to a system and method for static and dynamic positioning or motion control of a marine structure by using real-time monitoring of a mooring line, in which environmental external forces are reflected to monitor periodic or non-periodic coupled energy and response by a hydrodynamic or aerodynamic characteristic of a marine structure and a riser and mooring line in real time and an optimal static and dynamic positioning or motion control is performed to the marine structure based thereon. In the present disclosure, static and dynamic real-time monitoring data of the mooring line are obtained and processed for positioning the marine structure or controlling and managing a motion thereof.

In addition, the present disclosure relates to a system and method for static and dynamic positioning or motion control of a marine structure by using real-time monitoring of a marine environment, in which periodic or non-periodic coupled energy and response according to hydrodynamic or aerodynamic characteristics of marine environment elements such as wind direction, wind speed, air humidity, atmospheric pressure, atmosphere temperature, cloud height, visibility, ocean wave, wave height, sea current speed, sea current direction, rain or the like are monitored in real time and an optimal static and dynamic positioning or motion control is performed to the marine structure based thereon. In the present disclosure, various marine environment elements such as wind direction, wind speed, air humidity, atmospheric pressure, atmosphere temperature, cloud height, visibility, ocean wave, wave height, sea current speed, sea current direction, rain or the like are measured by means of real-time monitoring of marine environments, and suitable static and dynamic positioning or motion control and management is automatically performed to the marine structure accordingly.

Moreover, the present disclosure relates to a system and method for static and dynamic positioning or motion control of a marine structure by using real-time monitoring of 6 degrees of freedom (6-dof) movement of a marine structure, in which periodic or non-periodic coupled energy and response according to a 6-dof movement characteristic of the marine structure is monitored in real time, and optimal static and dynamic positioning or motion control is performed to the marine structure based thereon.

Further, the present disclosure relates to a system and method for static and dynamic positioning or motion control of a marine structure by using real-time monitoring of a tank state, in which periodic or non-periodic coupled energy and response according to a hydrodynamic or aerodynamic characteristic of at least one tank among an LNG, a ballast, a cargo-oil tank and a pipe in the marine structure are monitored in real time, and optimal static and dynamic positioning or motion control is performed to the marine structure based thereon.

In addition, the present disclosure relates to a system and method for static and dynamic positioning or motion control of a marine structure by using real-time monitoring of a ship topside, in which periodic or non-periodic coupled energy and response according to a hydrodynamic or aerodynamic characteristic of a pipes, facilities or the like located at a ship topside of the marine structure are monitored in real time, and optimal static and dynamic positioning or motion control is performed to the marine structure based thereon.

Further, the present disclosure relates to a system and method for static and dynamic positioning or motion control of a marine structure by using real-time monitoring of the seabed, in which periodic or non-periodic coupled energy and response according to at least one hydrodynamic characteristic among umbilical cables, pipes, pumps and valves located at the seabed are monitored in real time, and optimal static and dynamic positioning or motion control is performed to the marine structure based thereon.

BACKGROUND ART

1. Marine Structure (FIG. 1)

A marine structure means a structure having no component connected to the land and capable of staying at one point on the sea under any weather condition. The marine structure is used for various purposes. The marine structure may be installed for developing or producing submarine oil or gas fields or generating new regeneration energy (e.g., wind power, tidal power, wave power or the like) and may also be used as a port structure for a large oil tanker to come alongside the pier. In order to anchor a large oil tanker, a sufficient water level is required. Therefore, if dredging is not available, jetties and dolphins are extended to a deep point to build a port. This is a so-called offshore marine terminal. Recently, marine structures are often installed for power generators, bulk storage plants, fishing bases or the like.

Seeing materials of a marine structure, steel is used most. At this time, a portion submerging into the sea is made of a steel pipe with a circular section. The circular sectional shape receives less force from waves or sea currents, and a steel pipe pile may be used as a foundation. In addition, buoyancy may be applied thereto when a structure is installed.

An upper structure above the sea is made of shape steels such as H-beams which ensures easy fabrication and maintenance. Steel products are easily corroded and sessile marine lives easily inhabit thereat. In spite of such drawbacks, however, steel products are most widely used as a material of the marine structure due to easy fabrication and installation, clear design, stiff structure or the like.

In an area having a deep sea level and hard seabed topography, a concrete structure is frequently used. Concrete has good corrosion-resistance and may maintain a stable state just by its weight. A huge concrete cylinder may be used as a storage facility for storing oil or the like and may be easily carried and installed while ensuring easy structure inspection. However, such a concrete structure is limitedly used in the North Sea or polar regions since it is not easily fabricated and also limited to seabed topography conditions. The marine structures may be classified into three groups depending on their natures.

(1) Floating-Type Structure

The floating-type structure has been mainly used for oil drilling, and recently also used for ocean power plants, oil storage facilities or the like. A floating-type structure for oil drilling should ensure both mobility and fixedness. In other words, when oil drilling is failed, the floating-type structure can be instantly moved to another region, and during oil drilling, the floating-type structure should be firmly fixed not to give an excessive force to an oil drilling pipe. Three kinds of floating-type oil drilling ships are representatively used in the art.

a. Drill Ship (FIG. 2)

A drill ship has a self-propulsive function to ensure mobility, but its fixedness is ensured by means of mooring or dynamic positioning, which causes rolling or pitching under a bad weather to cause hardship on its operation.

b. Jack-Up Rig (FIG. 3)

In operation, three legs are fixed to the seabed to ensure stability. If oil drilling is finished, the legs are lifted up by means of a jack-up method so that the jack-up rig floats by the buoyancy of the hull. At this time, a draft line is used for towing so that the jack-up rig is moved to another region. The jack-up rig ensures better fixedness in comparison to a drill ship, but it cannot operate at a deep area and does not ensure good mobility. In addition, under a bad weather, the jack-up operation may be temporarily interrupted.

c. Semisubmersible Oil Drilling Ship (FIG. 4)

A semisubmersible oil drilling ship is a floating structure having four or six legs, and horizontal members, so-called pontoons, for connecting the legs create buoyancy. The semisubmersible oil drilling ship is structurally stable but may come into an unstable state at a bad weather since it has a great upper deck area and is likely to contain a lot of equipment thereon. For this reason, a rollover accident has been occurred. The semisubmersible oil drilling ship also requires great fabrication and operation costs since it does not have a self-propulsive function.

d. FPSO (Floating Production Storage Offloading) (FIG. 5)

FPSO is a floating production storage and offloading unit, which is a special ship suitable for small-sized deep oilfield development since it may allow loading and unloading as well as crude oil mining and also ensure free movement. Along with the coming presence of higher oil price, oil producers in various countries over the world greatly invest in oil exploration development projects on the assumption that the oil price increases further. Accordingly, a new-type FPSO having economic feasibility at offshore oil fields and ensuring convenient carriage, different from an existing fixed oil drilling ship, has appeared.

An overall figure of the FPSO is similar to a general supertanker. However, equipment required for oil purification, gas compression, crude oil unloading, sea water injection, self-power generation or the like is installed at its upper portion to ensure crude oil mining, purification, storage and unloading by itself.

Recently, it is attempted to build nuclear power plants, gas turbines, wave power plants, tidal power plants, see breeze power plants, solar power plants, waste incinerators or the like on a floating structure on the sea since it becomes more difficult to choose a site therefor due to environmental pollution and NIMBY phenomenon. In addition, an offshore airport formed as a large steel structure to ensure taking-off and landing for 24 hours a day is still remained as a long-term project. A lot of small- or medium-sized diesel power plants have been installed and operated on barges, and seawater desalination plants and oil and gas storage facilities are also installed as floating facilities.

(2) Fixed Structure

A steel pipe welded structure, so-called a jacket, is a fixed marine structure most frequently used in the art (FIG. 6). This structure is generally fabricated on the ground, loaded on a barge, carried to a desired region and then launched thereat. At this time, piles are driven by means of four to eight legs. Main facilities at an upper portion are supported by these piles, and a steel pipe structure supports these piles laterally by means of legs and braces so that the piles may incorporate against to a lateral force.

The jacket is named since this structure surrounds piles. A pile is driven into a depth of about 100 meters at the seabed to permanently fix an offshore platform in the seabed topography and transfers lateral and vertical loads to the seabed to stably maintain the structure.

Main facilities at the upper portion are composed of a structure having two or three decks, and in an offshore complex having several platforms, bridges are installed thereat to connect the platforms. The jacket platform generally has a life span of about 20 years and is widely used for oil producing and drilling at the seabed and residence on the sea.

A concrete gravity based structure (GBS), which is a kind of a fixed structure, has a supporting force by its weight, instead of piles, against an external load (FIG. 7). At this time, a stable and hard seabed ground is required in order to prevent subsidence at the gravity based structure for a long time.

A mono-tower concrete plate form having a great base is sometime installed in a polar region in order to decrease a risk of collision against an iceberg or in a deep sea having a hard seabed ground for a better economic design. In a shallow sea, an artificial island is formed by reclamation to make a marine city, an offshore airport, an oil production facility or the like.

(3) Mobile Structure

A mobile structure is a kind of floating-type structure, but a steel wire is connected from a fixed structure installed on the seabed to induce lateral stability of a floating structure. This structure has been designed to make an effort to install an economic structure in a deep sea. Guyed towers, tension leg platforms (TLP) or the like are regarded as such a mobile structure.

In the guyed tower, a vertical load of the platform is supported by a steel structure extending vertically to the seabed surface with no slant, and a lateral load is supported by steel wires connected in four directions to the steel structure and fixed to the seabed surface.

The TLP is a structure in which a steel wire (a tendon or tether) is connected vertically from a leg at each corner to the fixed structure at the seabed surface to cover a lateral load to some extent. Buoyancy of the upper platform constantly maintains the tension of the steel wires, and thus vertical movement of the platform is attenuated, which gives stability advantageous for deep sea oil well development. If the work at any place is completed, the TLP may be moved to another place and installed again, which is very advantageous when developing an oil well with a small oil resource. At earlier stages, the TLP was made of steel materials, but the upper structure and the seabed structure are gradually replaced with concrete to be used as a temporary oil storage facility.

In addition, as a deep seabed structure, there is also proposed an articulated tower in which an upper portion made in a jacket-type steel structure and a lower portion made with a concrete case are connected to each other, or an upper portion made of a concrete floating structure and a lower portion made of a steel truss are connected with special joints to remove a bending force.

2. Natural Conditions to be Considered in Designing a Marine Structure (1) Water Level and Seabed Topography A water level represents a vertical distance from a tidal datum till the seabed surface. Here, the tidal datum means a minimal low-water level, and the sea level rarely lowers below the tidal datum if ever. Accurate measurement of the water level and proper understanding on irregularity of the seabed topography of the region are a trigger of a marine structure design, and from them, it is possible to determine a height of the marine structure, a shape of the lower portion of the structure, a vertical location of a ship berth facility, a range of anti-corrosion design or the like and to verify geological stability of the structure. For continuous measurement of the water level, a precision depth recorder serving as a sound fathometer, a side scan sonar allowing two-dimensional understanding, or the like are used.

(2) Seabed Topography

Physical and engineering understanding on the seabed topography which supports the base of the marine structure is essential to design an economic and safe structure. The seabed topography is investigated to analyze topography of the seabed surface and the seabed stratum till a lower bed rock. The seabed topography is generally investigated by obtaining a continuous topography sampling by direct boring and analyzing the same at a laboratory to collect design data.

However, as a preprocess of the boring, seabed topography information around the structure should be collected using geophysical equipment such as a subbottom profiler, a boomer, a sparker, an air gun or the like. At this time, for more substantial understanding on a swallow stratum, samples may be also collected using a piston driller, a grab sampler or the like. This is because seabed topographical characteristics of the seas around an installation spot of the structure should be figured out in advance to determine a main boring point, and topographical states of other non-boring regions should also be checked. If any unusual structure in a fault or sedimentary stratum, an abrupt change of the seabed topography, abnormal erosion, a stream of sediments or the like is found in the seas around the structure, a serious problem may occur on the stability of the structure.

After geophysical inspection data are analyzed, in consideration of the degree of stratum change of the surroundings, the shape, importance and number of marine structures are determined. The drilled samples give basic data for figuring out various soil characteristics as well as stress factor and displacement of piles through field analysis and laboratory analysis to make a foundation design. In particular, a stratum near the seabed surface should be analyzed intensively since soil at the stratum gives a great influence in calculating settlement, allowable bearing capacity, horizontal displacement or the like of the structure.

(3) See Breeze

Wind applies pressure or causes vibrations to an upper structure or facilities on the sea surface, thereby giving an influence thereto. The intensity of wind is trivial in comparison to the wave or sea current, but the wind should not be ignored since it gives a great moment arm from the seabed surface.

The wind on the sea surface may be classified into sudden gust and continuous wind. The sudden gust is wind whose wind direction and wind speed generally continue less than 1 minute, and the continuous wind is wind whose wind direction and wind speed generally continue over 1 minute. A wind speed of the continuous wind is used for foundation design of a marine structure, and the sudden gust is applied in designing each unit facility and a small structure which is sensitive to wind.

At a deep sea guyed tower or a tension leg platform having a long natural period, the wind speed spectrum should be used in order to consider a dynamic effect according to the natural period.

(4) Wave

In designing a marine structure, the sea wave gives a greatest influence. The sea wave most directly gives a great force to the foundation design or each component of the structure and thus serves as a critical element in designing sizes or lengths of components.

The most important characteristic of the wave is irregularity. For this reason, a spectrum model becomes a barometer representing any sea state, and at this the structure should also be analyzed in a statistical way. However, in the light of convenient designing as well as reason and experience, a regular wave modeling is also considered as being very suitable for designing a marine structure. The regular wave defines a wave to have a series of waveform with a constant wavelength, a constant wave height and a constant wave period. The regular wave models available in the art includes an airy wave, a fifth-order stoke wave, a stream function or the like.

An applied wave model depends on a water level, a structure shape, an applied wave height or the like. The wave selected as above is called a design wave, and the design wave has three variables, namely a wave height, a wave period and a waver level. From the design wave, velocity and acceleration of water particles applied to each point of each member or the structure are calculated to select a final wave power from the Morrison equation.

Wave is generated due to various reasons, particularly wind, and for this reason, in designing a structure, wind and wave are applied in the same direction to obtain a maximum design external force. In addition, if sea wave data for a reasonable period are present about the installation region of the marine structure, the design wave may be obtained without a special difficulty. However, in many cases, there is present only wind speed data, and thus various methods for calculating a design wave from the wind speed have been developed. At this time, a cautious wave height and a mean wave period are obtained in a statistical way in consideration of a repetition period, and a maximum wave height (a design wave height) and a wave period corresponding thereto are calculated therefrom.

(5) Sea Current

If wave has a stream with a waveform formed by vibrations of water particles, the sea current may be regarded as a stream in which water particles directly move in a horizontal direction due to various factors. Therefore, if this stream meets the structure, a constant horizontal force is applied to the structure, and when a ship approaches the marine structure for berthing, the sea current gives a constant influence on the ship.

Factors of generating a sea current may be classified into large-scale factors and local factors. The large-scale factors may include a constant wind, rotation of the earth, difference in temperatures or salinities or the like, and the local factors may include sediments on the seabed, wave, tide, wind, typhoon or the like. The velocity of water particles by the sea current is added as a vector sum to the velocity of water particles by the sea wave to form an overall force applied to the structure.

(6) Tide

Among influences applied by movement of celestial bodies, the tide outstands most. A flood time caused when the gravitations of the moon and the sun are added and an ebb tide caused in a reverse case are familiar sea movements acquainted by anyone through experiments. However, ascending and descending of the sea level is not caused only by celestial bodies, but the phenomenon locally caused by wind, wave, or difference in pressures should not be ignored. Therefore, the maximum design water level is determined in consideration of all factors as above.

If the structure is close to the coast or located in a closed island sea such as a bay, the ascending and descending effect of tide or the like becomes more conspicuous. Therefore, if this effect is not suitably considered in designing, a serious problem may be caused. Generally, an external force should be calculated and the height of the deck should be determined based on the case in which a maximum wave height applies to the structure at the maximum water level. In addition, a vertical range of a maximum water level and a minimum water level is calculated, and facilities for anchoring a ship should be installed according to the vertical range. Moreover, in case of a steel structure, the vertical range should be applied in selecting a maximum corrosion range, a thickness of sessile marine lives.

(7) Seabed Earthquake

An aseismic design is essential for a marine structure, and if the marine structure is dynamically sensitive, a dynamic analysis by earthquake must be accompanied. In case of a structure with a high importance or an extra-large structure, a lower topography structure is thoroughly investigated to consider dislocation or sediment transfer which may occur all-at-once by earthquake.

(8) Marine Bodies

As time goes, marine bodies stick to the marine structure and grow thereat. As the marine bodies grow to have a thickness of 2 to 3 centimeters, an area and volume of each component to which wave or sea current is applied increases rapidly. In addition, the external surface of each component becomes rougher to increase a drag effect, and in case of a steel material, corrosion may be locally promoted. Therefore, in designing, the effect of marine bodies must be considered. Meanwhile, as sessile marine lives cover the surface of the structure, it becomes more difficult to maintain and manage the marine structure, and thus it is required to partially remove the marine bodies.

(9) Others

In addition to the above, density and salinity of sea water associated with corrosion of a steel marine structure and properties of sea water, an abrupt change of sea water temperature according to depth, a hydrostatic pressure increasing 1 atmospheric pressure per 10 meters or the like are natural conditions which should be basically considered in designing. Moreover, instability of the seabed ground, which may be caused by sea wave, seabed earthquake, rapid sediment or the like, as well as scouring and deposition, which may occur around the marine structure foundation by constant sea current or sea wave, should also be addressed in the foundation design.

3. Mooring System of a Marine Structure

A mooring system of a marine structure includes three types, namely a single-point mooring system, a multi-point mooring system and a dynamic positioning system.

(1) Single-Point Mooring System (FIG. 8)

The single-point mooring system is frequently used for unloading oil, and particularly widely used in a deep sea level instead of a fixed structure. The fixed structure needs a small maintenance cost and has a high operation rate in the oil unloading work, while the single-point mooring system needs more maintenance cost but has a low early stage investment. The single-point mooring system has a following structure.

a. CALM (catenary anchor leg mooring) type: a structure is moored to mooring cables from a multi-point mooring buoy. Most of them are single-point mooring systems and suitable for a water level not greater than several ten meters.

b. SALM (single anchor leg mooring) type: this moors to a structure having an agitating-column buoy. This type is suitable for a water level of several ten to several hundred meters.

c. Yoke type: a structure is moored from a CALM type or SALM type buoy.

d. Turret type: a cylinder coupled to a rotating machine at the center of the structure is moored at multi points such as the CALM-type buoy.

(2) Multi-Point Mooring System

The multi-point mooring system is a mooring system for maintaining a marine structure at a certain location accurately and preparing a great mooring force, and is adapted to an ocean work vessel, an oil drilling rig or the like.

The mooring cable may be arranged in various patterns. The mooring cable uses a wire rope and a chain, or an intermediate sinker or buoy is installed to stabilize the mooring cable. An anchor is subject to a horizontal force (having a tangential angle $\theta=0$ at the seabed surface), but the sinker is subject to a horizontal force and a vertical force (an access angle $\theta>0$).

(3) Dynamic Positioning System (FIG. 9)

Mooring using a mooring cable is limited to a water level, and thus there are not many records in a water level over several hundred meters even for an oil drilling rig. In order to maintain a marine structure at a constant location without using a mooring cable, a dynamic positioning system is used. A location of the marine structure is detected by using a global positioning system (GPS), and a screw and a thruster are operated by calculating an operation amount required for maintaining the marine structure at a predetermined location.

The quiescence of the dynamic positioning system is expressed as a ratio (%) of a horizontal movement amount with respect to a water level, and about 1% at a water level of about 100 meters. Along with an increase of the water level, the ratio also increases. In particular, in a marine structure having a riser, the ratio has a limit of about 5%, and if the ratio becomes 10%, the riser may be bent or broken. For this reason, the quiescence of the dynamic positioning system should be carefully maintained. The location of the marine structure may be maintained by the mooring system in a water level over several hundred meters, but as the water level increases, the dynamic positioning system may be more advantageously used.

4. Stable Mooring of a Marine Structure

As described above, the marine structure may float on the ocean and function to product, store and/or unload liquefied gas. In particular, a floating marine structure such as LNG FPOS is a ship for a complicated function by mounting facilities for producing (or, collecting) natural gas at the ocean and then liquefying and storing the same, thereby decreasing the necessity of a land liquefying and storing facility which consumes enormous expends.

A floating marine structure such as LNG FPOS has a rotary turret, and a turret and an anchor of the seabed may be connected to mooring lines to moor the marine structure on the ocean. The rotary turret is fixed by the mooring line and the anchor, but the marine structure may operate properly at a fixed location on the ocean in spite of wave since its hull may move in a rotating direction based on the rotary turret.

Here, if the mooring line and the anchor are broken beyond an allowable level of the system, a flexible riser connecting the single point mooring (SPM) and the pipe line end manifold (PLEM) is damaged, which results in spillage of high-pressure and high-temperature crude oil. Such an oil spillage accident causes huge economical, life and environmental losses. In addition, as the concern on environments rises over the world, the damage of SPM should be prevented in advance.

Meanwhile, design and interpretation of mooring devices which have been installed and used until now have totally depended on foreign technology. In fact, a mooring device is not designed suitably for an environment of an installation region, and an interpretation program for mooring devices is imported from foreign countries, which consumes enormous foreign currency. Therefore, it is required to make a long-term plan to actively and aggressively secure technical skills for developing marine resources continually, and thus to enhance the import substitution effect.

In addition, a tension applied to each mooring line of a marine structure is not regular but changes continuously due to a loading amount, a change of tide, or a difference between the ebb and flow. Moreover, if cargos are loaded to or unloaded from a ship while a floating marine structure is being moored, the ship may be dipped more or less due to a difference in buoyancy according to the change of loaded cargos. In this case, the tension applied to the mooring line also continuously changes accordingly.

Therefore, since the tension of the mooring line of the marine structure changes continuously, a worker should frequently monitor whether an excessive tension is applied to a specific rope, and in order to suitably distribute the tension, the mooring line should be tightened or loosened appropriately.

In addition, in an existing art, the degree of tension applied to a mooring line is judged based on experience or naked eye of a worker. However, a tension monitoring system has recently introduced to large ships such as an oil tanker and a gas carrier so that tensions applied to a plurality of mooring lines are monitored through a monitoring computer installed at a control center.

Moreover, in order to exactly analyze an accurate location, behavior and stability of two articles floating on the ocean by using a real-time data management system and then predict and alarm an emergent situation, sensors for sensing marine environments and behavior states should be developed, installed and operated. In particular, a next-generation mooring system for material development, behavior analysis, installation technique, operating technique, system management or the like should be developed to make a perfect mooring system.

SUMMARY

The present disclosure is designed to solve the problems of the related art, and therefore the present disclosure is directed to providing a system and method for static and dynamic positioning or motion control of a marine structure, in which a defect and tension of a mooring line is measured by means of real-time monitoring of the mooring line and further a life span of the mooring line is accurately expected so that an optimal static and dynamic positioning or motion control is performed to the marine structure based thereon. In the present disclosure, static and dynamic real-time monitoring data of the mooring line are obtained and processed for positioning the marine structure or controlling and managing a motion thereof.

In addition, the present disclosure is designed to solve the problems of the related art, and therefore the present disclosure is directed to providing a system and method for static and dynamic positioning or motion control of a marine structure, in which various marine environment elements such as wind direction, wind speed, air humidity, atmospheric pressure, atmosphere temperature, cloud height, visibility, ocean wave, wave height, sea current speed, sea current direction, rain or the like are measured by means of real-time monitoring of the marine environment, and suitable static and dynamic positioning or motion control and management is automatically performed to the marine structure accordingly.

In addition, the present disclosure is designed to solve the problems of the related art, and therefore the present disclosure is directed to providing a system and method for static and dynamic positioning or motion control of a marine structure by using real-time monitoring of 6 degrees of freedom (6-dof) movement of a marine structure, in which 6-dof movement of the marine structure is monitored in real time so that optimal static and dynamic positioning or motion control is performed to the marine structure based thereon.

In addition, the present disclosure is designed to solve the problems of the related art, and therefore the present disclosure is directed to providing a system and method for static and dynamic positioning or motion control of a marine structure by using real-time monitoring of a tank state, in which ullage and sloshing data of various tanks in the marine structure are measured by means of real-time monitoring of a tank state so that optimal static and dynamic positioning or motion control is performed to the marine structure based thereon.

In addition, the present disclosure is designed to solve the problems of the related art, and therefore the present disclosure is directed to providing a system and method for static and dynamic positioning or motion control of a marine structure by using real-time monitoring of a ship topside, in which a damage and life of a pipes, facilities or the like located at a ship topside of the marine structure are measured by means of real-time monitoring of the ship topside so that optimal static and dynamic positioning or motion control is performed to the marine structure based thereon.

In addition, the present disclosure is designed to solve the problems of the related art, and therefore the present disclosure is directed to providing a system and method for static and dynamic positioning or motion control of a marine structure by using real-time monitoring of the seabed, in which a damage or life of umbilical cables, pipes, pumps and valves located at the seabed are measured by means of real-time monitoring of the seabed so that optimal static and dynamic positioning or motion control is performed to the marine structure based thereon.

In one aspect of the present disclosure, there is provided a system for static and dynamic positioning or motion control of a marine structure by using real-time monitoring of at least one of a mooring line, marine environments, 6 degrees of freedom (6-dof) movement of a marine structure, a tank state, a ship topside, the seabed, or their combinations, the system including: a processor unit 100 having at least one interface; a light sensor measuring unit 200a to 200f connected to the processor unit 100 to operate for at least one of a mooring line, marine environments, 6-dof movement of a marine structure, a tank state, a ship topside, the seabed, or their combinations; a data measuring unit 300a to 300f connected to the processor unit 100 to operate for at least one of a mooring line, marine environments, 6-dof movement of a marine structure, a tank state, a ship topside, the seabed, or their combinations; an external equipment connecting unit 400 connected to the processor unit 100; and a time information synchronous connecting unit 500 connected to the processor unit 100, wherein the processor unit 100 includes an algorithm controlling processor 600 configured to control a motor and hydraulic device 900 by using a previously stored control algorithm; a motor-driving and hydraulic-driving unit 700 operated by the algorithm controlling processor 600; a motor and hydraulic device 900 operated by the motor-driving and hydraulic-driving unit 700; and a signal transmitting/receiving unit 800 configured to transmit a control command from the processor unit 100 to the algorithm controlling processor 600 or receive driving information from the algorithm controlling processor 600 to the motor and hydraulic device 900, wherein the motor and hydraulic device 900 includes a motor winch 910 and a rotary turret 920, and wherein the processor unit 100 tightens or loosens a mooring line 7 connected to a motor winch 910 according to a previously stored control algorithm by using data measured by the light sensor measuring unit 200a to 200f and the data measuring unit 300a to 300f and controls rotation of a rotary turret 920.

In another aspect of the present disclosure, there is also provided a method for static and dynamic positioning or motion control of a marine structure by using real-time monitoring of at least one of a mooring line, marine environments, 6-dof movement of a marine structure, a tank state, a ship topside, the seabed, or their combinations, the method being implemented on a system for static and dynamic positioning or motion control of a marine structure by using real-time monitoring of at least one of a mooring line, marine environments, 6-dof movement of a marine structure, a tank state, a ship topside, the seabed, or their combinations, the system including: a processor unit 100 having at least one interface; a light sensor measuring unit 200a to 200f connected to the processor unit 100 to operate for at least one of a mooring line, marine environments, 6-dof movement of a marine structure, a tank state, a ship topside, the seabed, or their combinations; a data measuring unit 300a to 300f connected to the processor unit 100 to operate for at least one of a mooring line, marine environments, 6-dof movement of a marine structure, a tank state, a ship topside, the seabed, or their combinations; an external equipment connecting unit 400 connected to the processor unit 100; and a time information synchronous connecting unit 500 connected to the processor unit 100, wherein the processor unit 100 includes an algorithm controlling processor 600 configured to control a motor and hydraulic device 900 by using a previously stored control algorithm; a motor-driving and hydraulic-driving unit 700 operated by the algorithm controlling processor 600; a motor and hydraulic device 900 operated by the motor-driving and hydraulic-driving unit 700; and a signal transmitting/receiving unit 800 configured to transmit a control command from the processor unit 100 to the algorithm controlling processor 600 or receive driving information from the algorithm controlling processor 600 to the motor and hydraulic device 900, wherein the motor and hydraulic device 900 includes a motor winch 910 and a rotary turret 920, and wherein the processor unit 100 tightens or loosens a mooring line 7 connected to a motor winch 910 according to a previously stored control algorithm by using data measured by the light sensor measuring unit 200a to 200f and the data measuring unit 300a to 300f and controls rotation of a rotary turret 920, wherein the motor and hydraulic device 900 includes a motor winch 910 and a rotary turret 920, wherein the method includes: by the light sensor measuring unit 200a to 200f and the data measuring unit 300a to 300f, measuring or sensing in real time at least one or a combination of: change of tension of the mooring line 7; marine environment data about at least one of wind direction, wind speed, air humidity, atmospheric pressure, atmosphere temperature, cloud height, visibility, ocean wave, wave height, sea current speed, sea current direction and rain; 6-dof movement of the marine structure; ullage and sloshing data of a tank loaded in the marine structure; damage and life of at least one of pipes and facilities located at a ship topside of the marine structure; and damage and life of at least one of umbilical cables, pipes, pumps and valves located on the seabed; by the external equipment connecting unit 400, sampling the light sensor measuring unit 200a to 200f and the data measuring unit 300a to 300f at the same time and matching data sensed at the same time when analyzing the data measured by measurement devices; by the time information synchronous connecting unit 500, implementing a mutual synchronization function for the data sensed by the light sensor measuring unit 200a to 200f and the data measuring unit 300a to 300f by using a GPS, Gyro and SONAR module; and by the processor unit 100, tightening or loosening a mooring line 7 connected to a motor winch 910 according to a previously stored control algorithm by using data measured by the light sensor measuring unit 200a to 200f and the data measuring unit 300a to 300f and controlling rotation of a rotary turret 920.

According to the present disclosure, it is possible to measure a tension of a mooring line by means of real-time monitoring of the mooring line and suitably perform static and dynamic positioning or motion control and management to the marine structure automatically based thereon. In addition, by accurately expecting a life of the mooring line by means of static and dynamic real-time monitoring of the mooring line, it is possible to extend the life by avoiding a critical point of the mooring line. Moreover, even though a lot of costs are consumed to perform periodic underwater ROV inspection to a mooring line, in the present disclosure, the cost required for the underwater inspection may be reduced since the mooring line is monitored in real time. Further, since at least one sensor is applied to the mooring line, a mode shape of the mooring line may be accurately figured out, and also it is possible to obtain a direction and velocity of sea current and tide per season, per day or according to each water depth.

In addition, according to the present disclosure, various marine environment elements such as wind direction, wind speed, air humidity, atmospheric pressure, atmosphere temperature, cloud height, visibility, ocean wave, wave height, sea current speed, sea current direction, rain or the like may be measured by means of real-time monitoring of the marine environment, and suitable static and dynamic positioning or motion control and management may be automatically performed to the marine structure accordingly.

Moreover, according to the present disclosure, 6-dof movement of the marine structure may be monitored in real time so that optimal static and dynamic positioning or motion control is performed to the marine structure based thereon.

In addition, according to the present disclosure, which ullage and sloshing data of various tanks in the marine structure may be measured by means of real-time monitoring of a tank state so that optimal static and dynamic positioning or motion control is performed to the marine structure based thereon.

In addition, according to the present disclosure, a damage and life of a pipes, facilities or the like located at a ship topside of the marine structure are measured by means of real-time monitoring of the ship topside so that optimal static and dynamic positioning or motion control is performed to the marine structure based thereon.

Moreover, according to the present disclosure, a damage or life of umbilical cables, pipes, pumps and valves located at the seabed may be measured by means of real-time monitoring of the seabed so that optimal static and dynamic positioning or motion (posture) control is performed to the marine structure based thereon.

DETAILED DESCRIPTION

Hereinafter, the present disclosure will be described in detail with reference to the accompanying drawings. First, when endowing reference symbols to components in each figure, it should be understood that the same component is designated by the same reference symbol though it is depicted in several figures. In addition, in the explanation of the present disclosure, if any known component or function is deemed to make the essence of the present disclosure unclear, this may not be described in detail.

Figure 1:
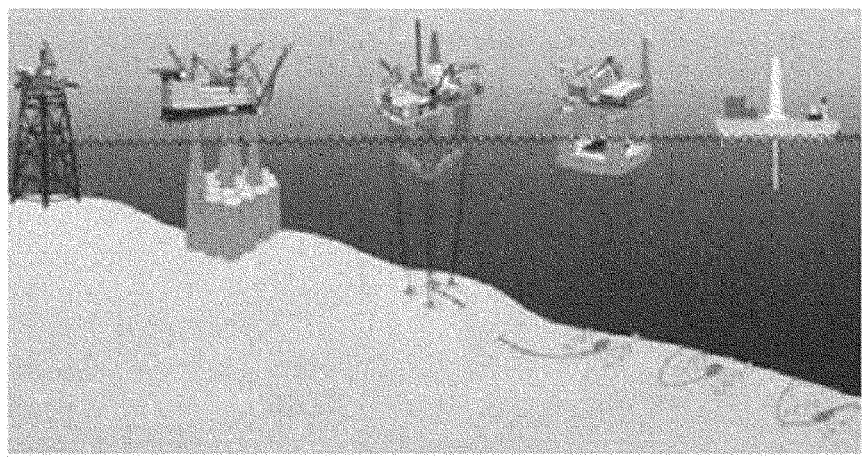
FIG. 1 is a diagram showing various kinds of marine structures.
Figure 2:
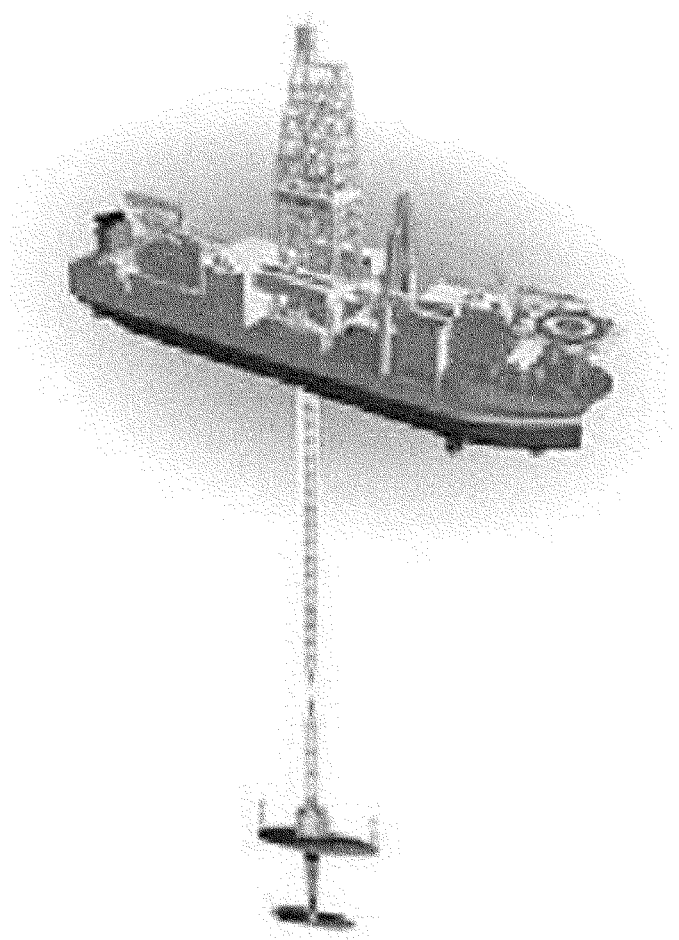
FIG. 2 is a diagram showing a drill ship.
Figure 3:
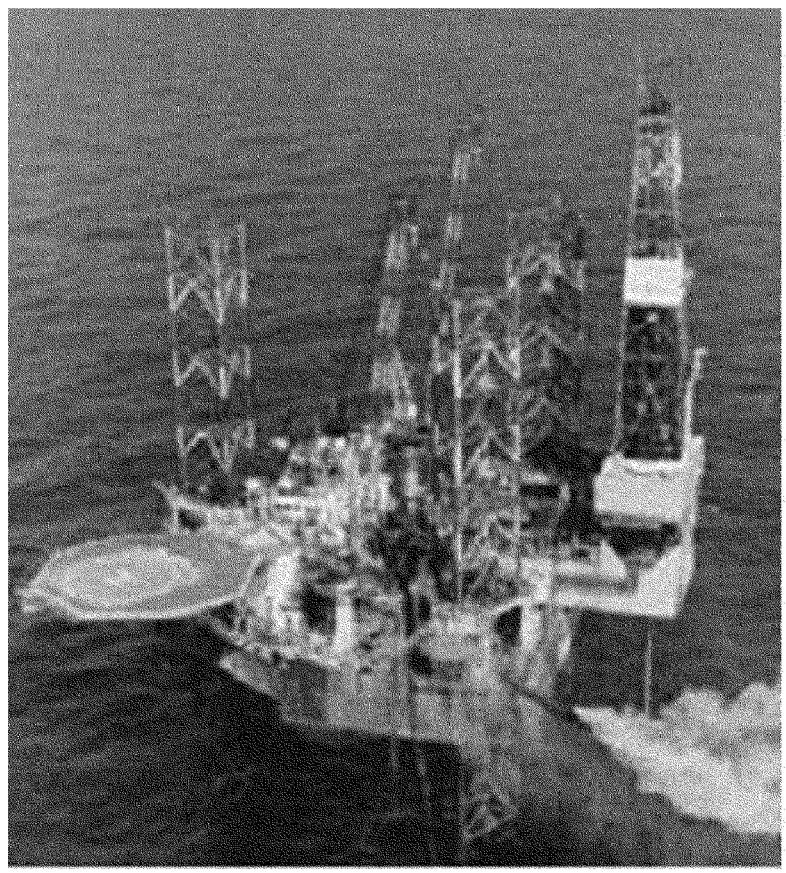
FIG. 3 is a diagram showing a jack-up rig.
Figure 4:
FIG. 4 is a diagram showing a semisubmersible oil drilling ship.
Figure 5:
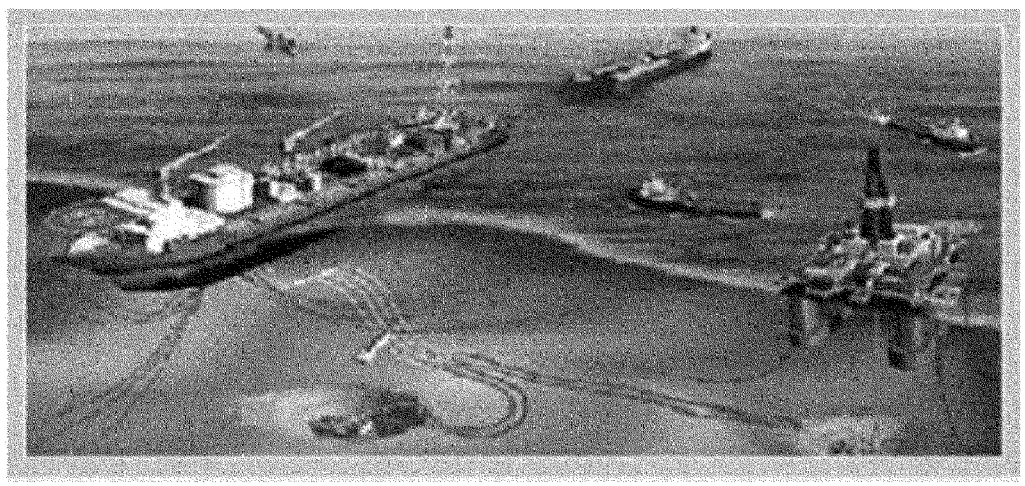
FIG. 5 is a diagram showing a floating production storage offloading (FPSO).
Figure 6:
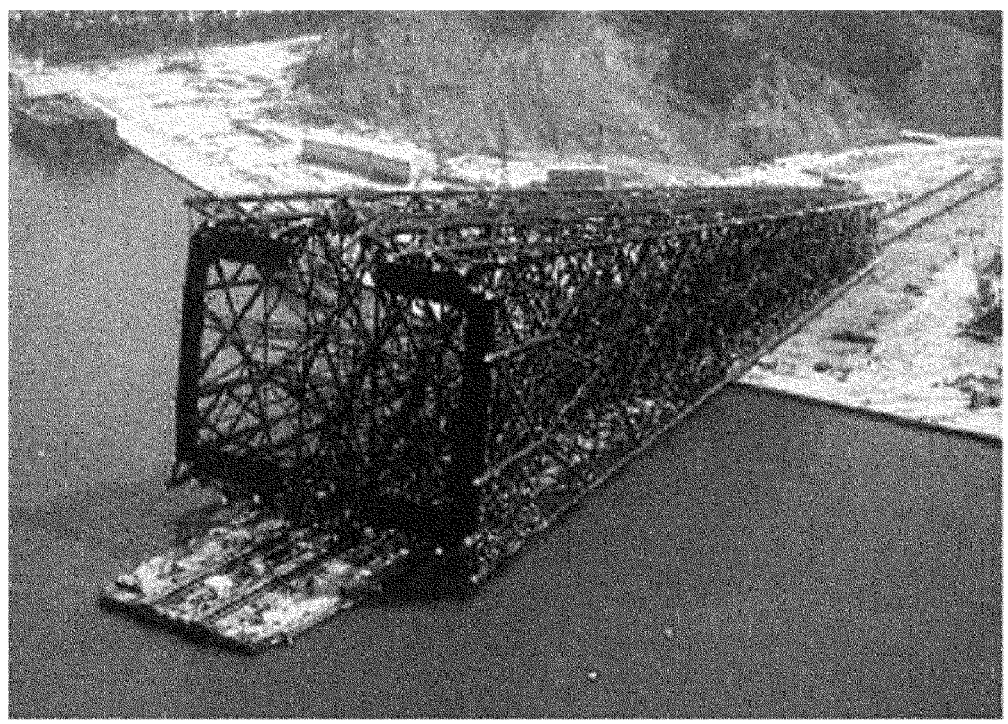
FIG. 6 is a diagram showing a jacket.
Figure 7:
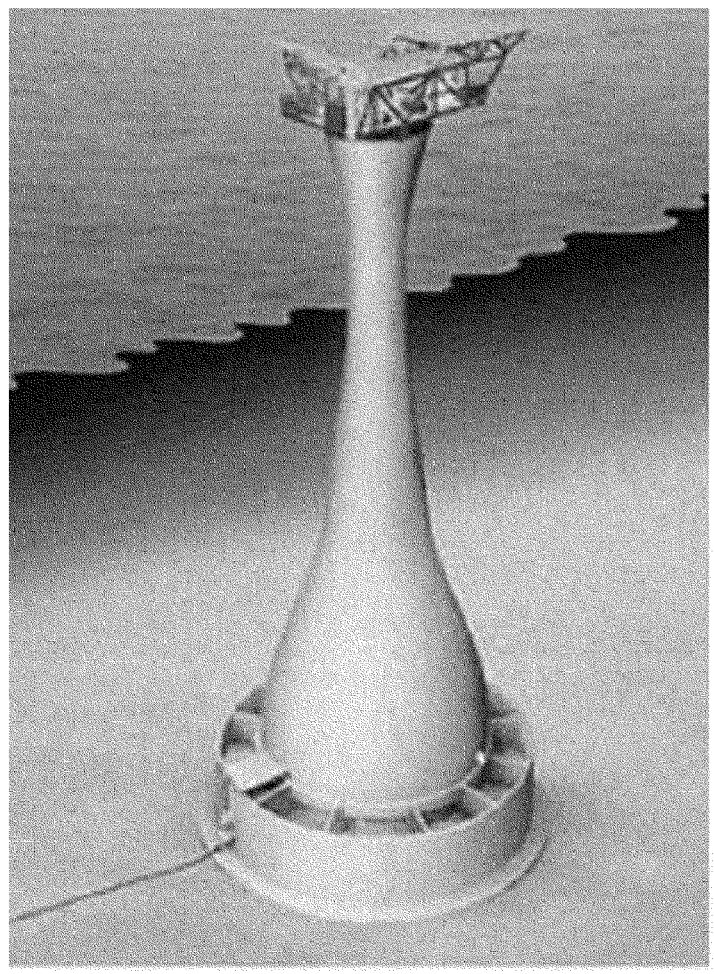
FIG. 7 is a diagram showing a concrete gravity based structure (GBS).
Figure 8:
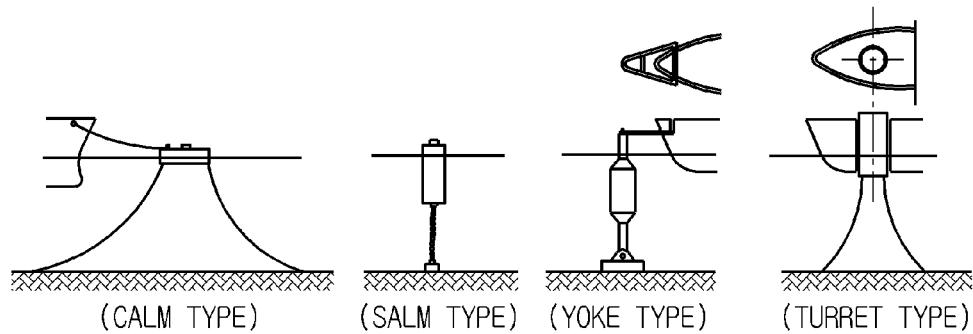
FIG. 8 is a diagram showing a single-point mooring system which is a kind of a mooring system of a marine structure.
Figure 9:
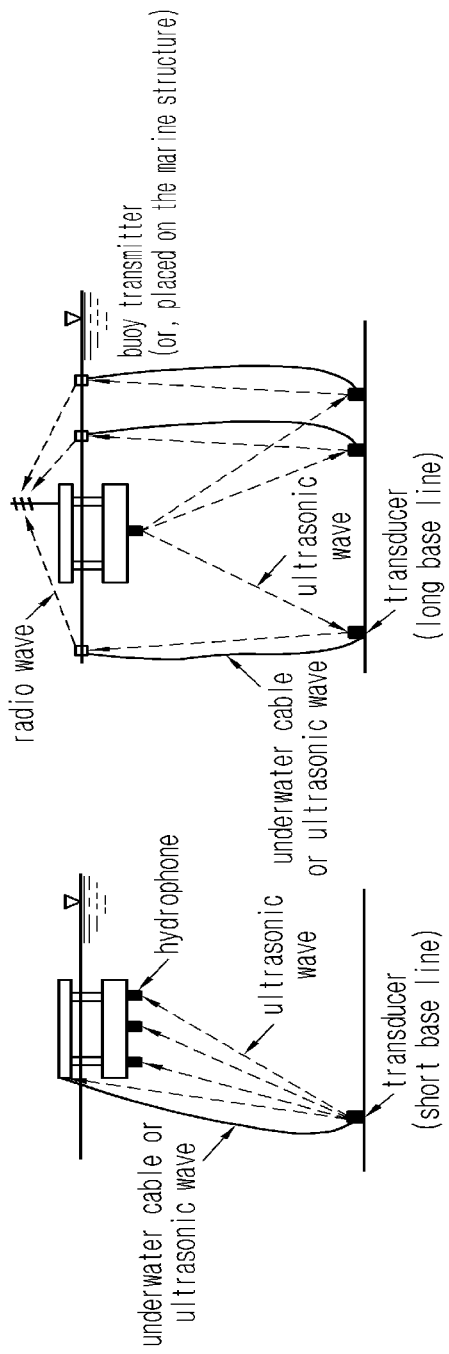
FIG. 9 is a diagram showing a dynamic positioning system which is a kind of a mooring system of a marine structure.
Figure 10:
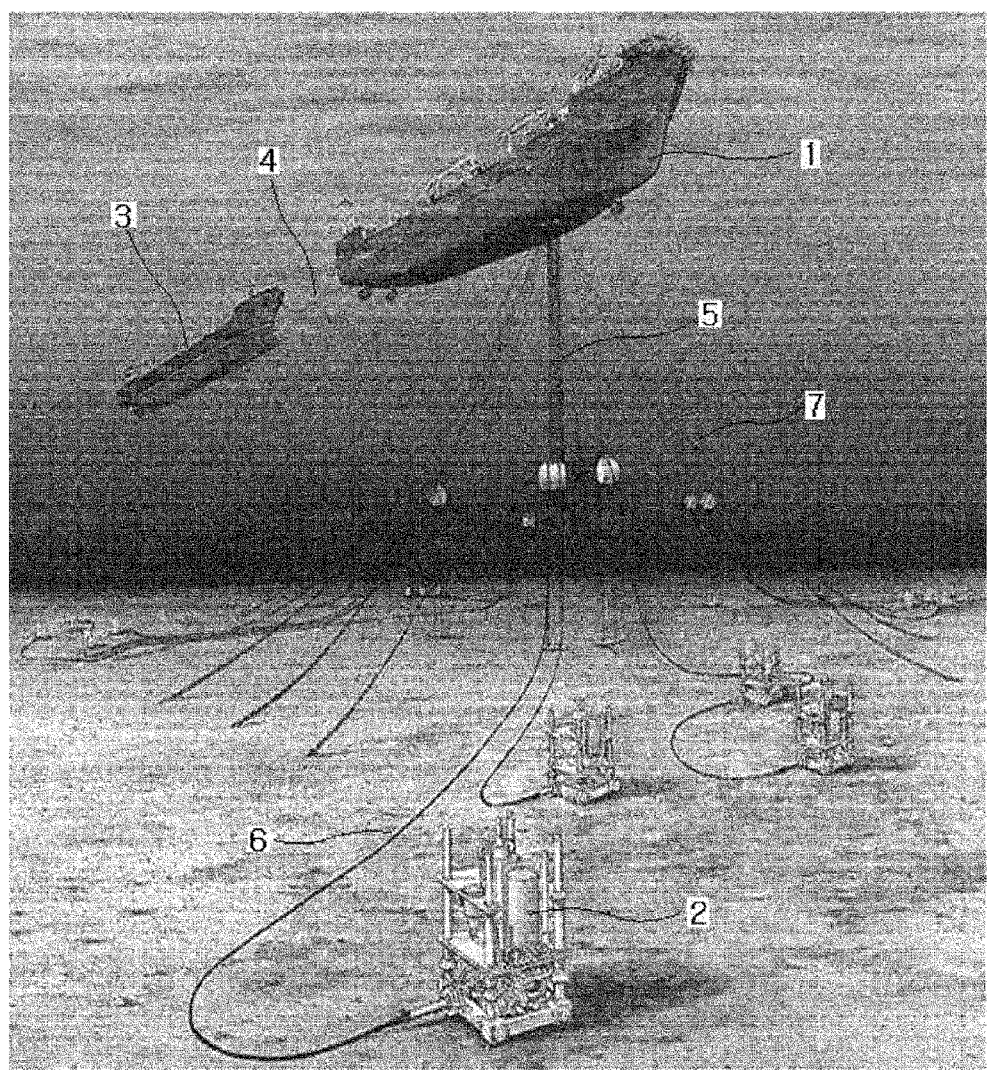
FIG. 10 is a diagram showing surrounding environments of a marine structure to which the present disclosure is applied.
Figure 11A:
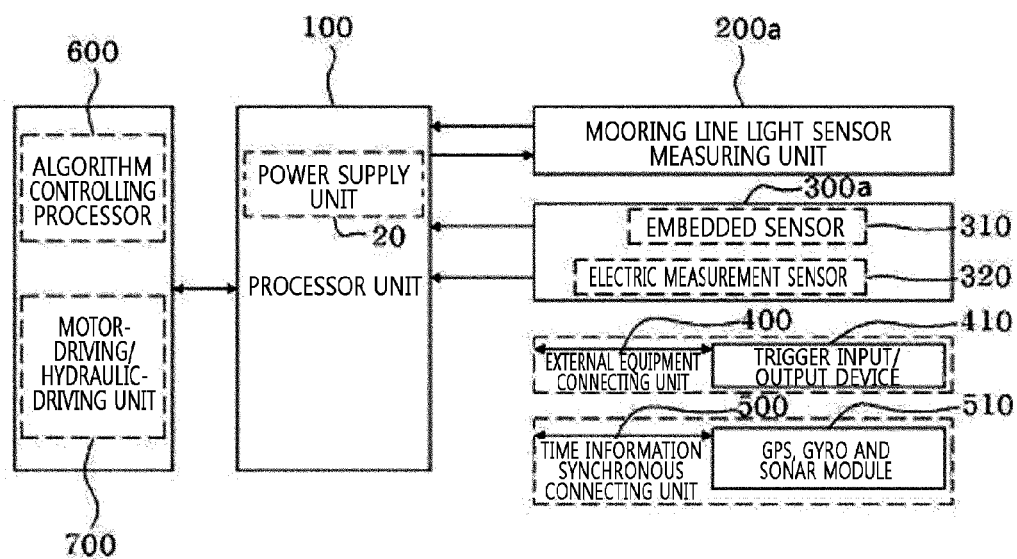
FIG. 11A is a block diagram showing a system for static and dynamic positioning or motion control of a marine structure by real-time monitoring of a mooring line according to the present disclosure.
Figure 11B:
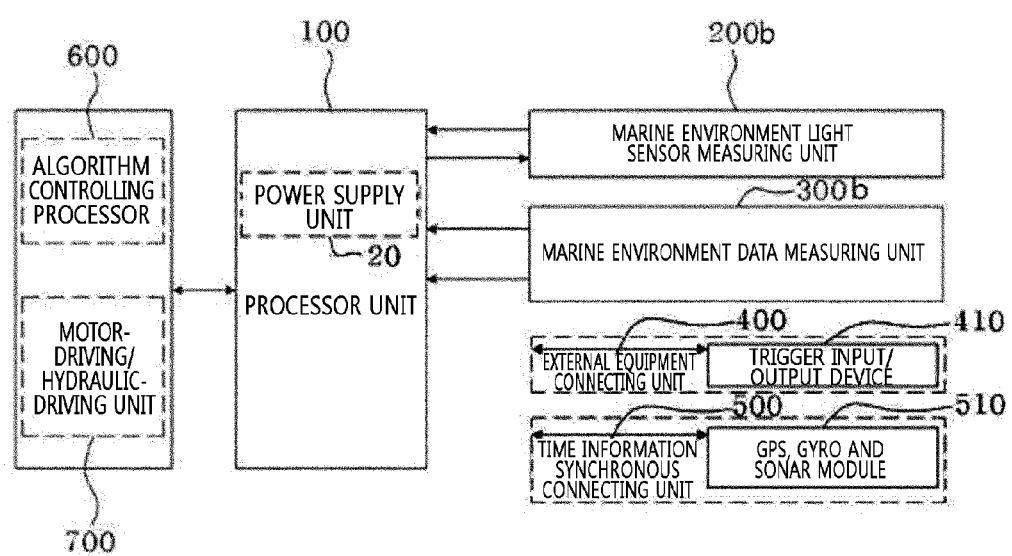
FIG. 11B is a block diagram showing a system for static and dynamic positioning or motion control of a marine structure by real-time monitoring of marine environments according to the present disclosure.
Figure 11C:
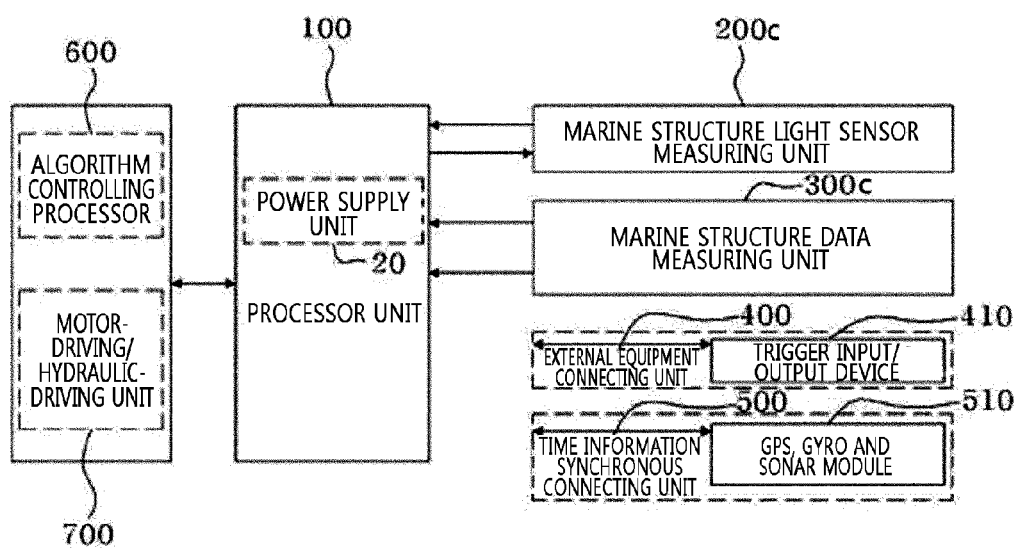
FIG. 11C is a block diagram showing a system for static and dynamic positioning or motion control of a marine structure by real-time monitoring of 6-dof movement of a marine structure according to the present disclosure.
Figure 11D:
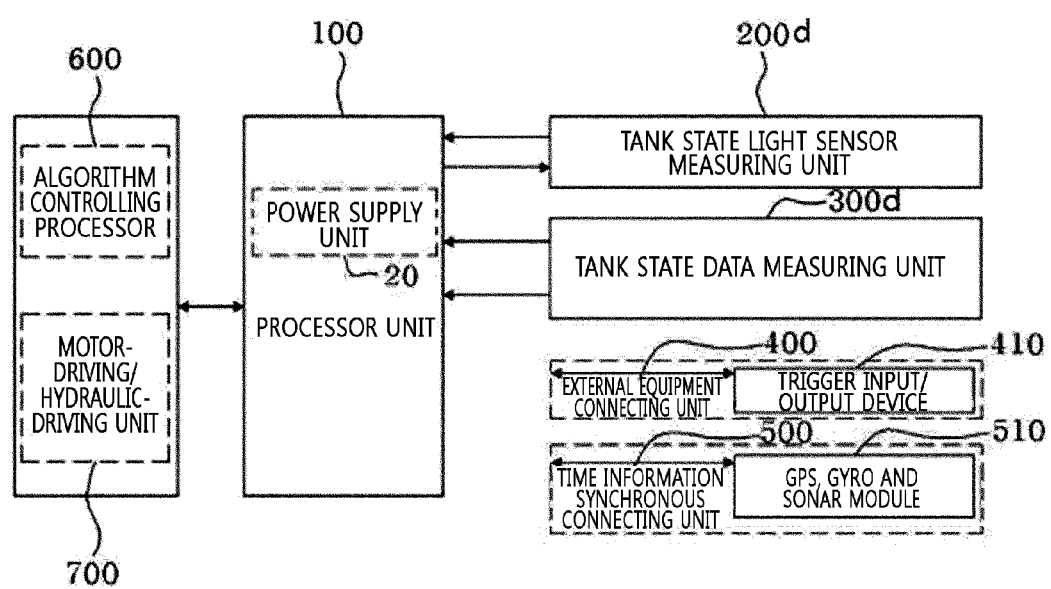
FIG. 11D is a block diagram showing a system for static and dynamic positioning or motion control of a marine structure by real-time monitoring of a tank state according to the present disclosure.
Figure 11E:
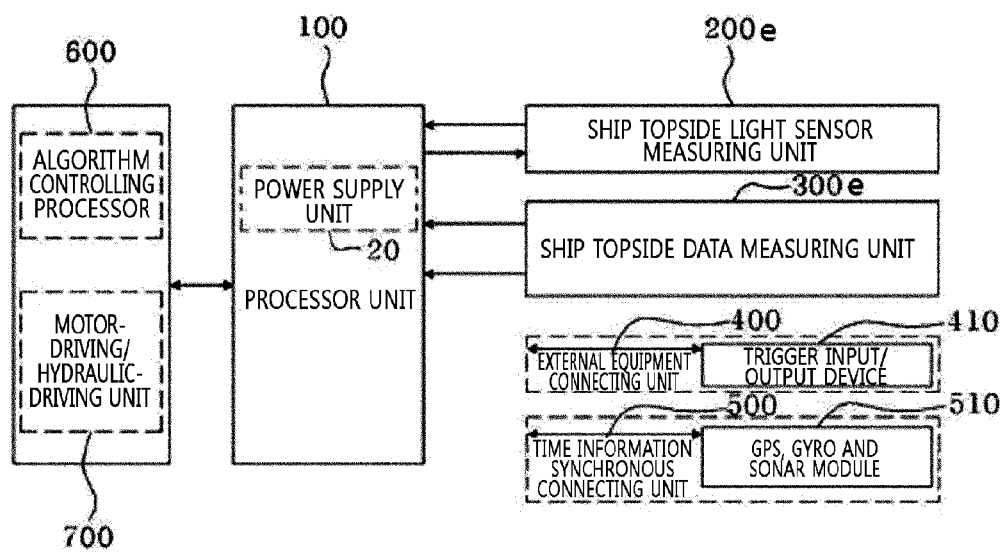
FIG. 11E is a block diagram showing a system for static and dynamic positioning or motion control of a marine structure by real-time monitoring of a ship topside according to the present disclosure.
Figure 11F:
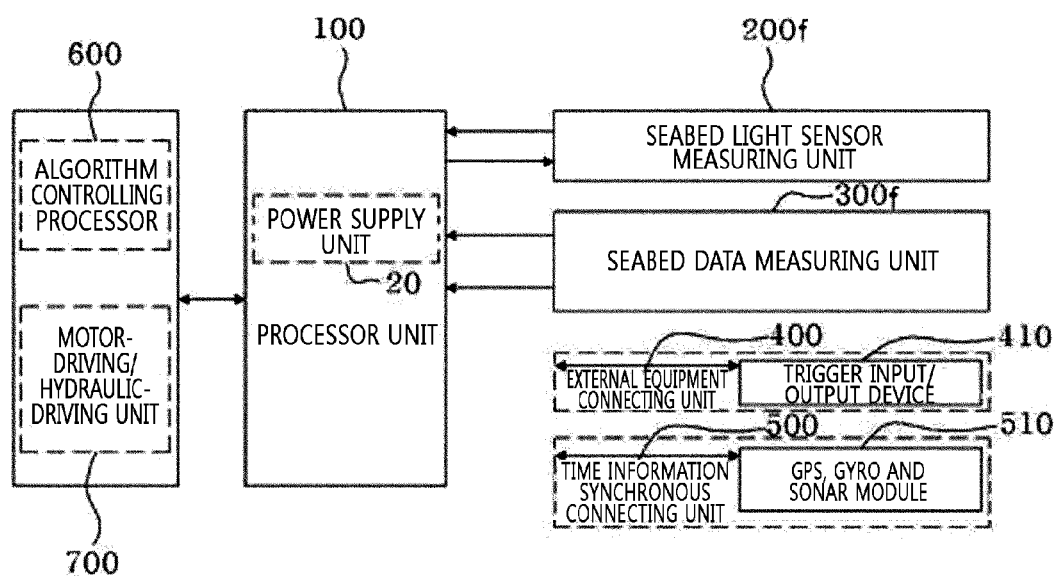
FIG. 11F is a block diagram showing a system for static and dynamic positioning or motion control of a marine structure by real-time monitoring of the seabed according to the present disclosure.
Figure 12:
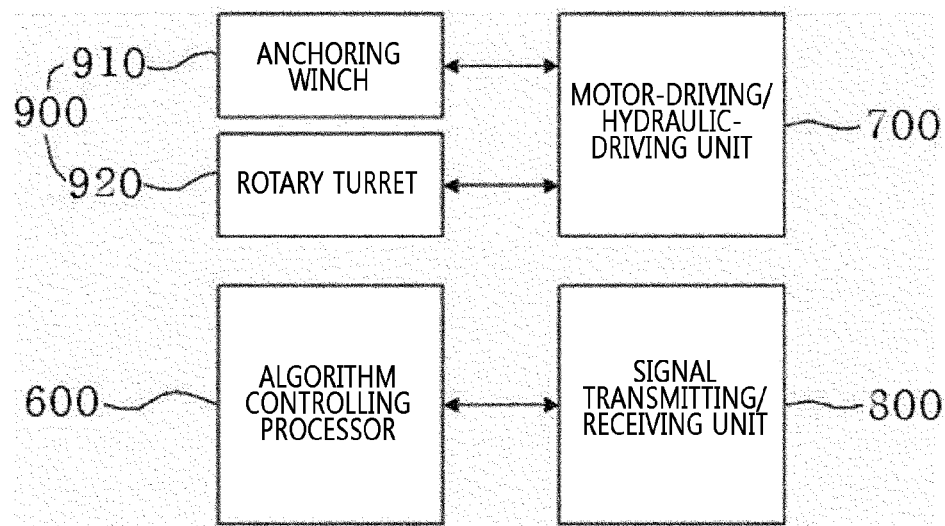
FIG. 12 is a block diagram showing a peripheral configuration connected to a processor unit depicted in FIGS. 11*a* to 11*f.*
Figure 13A:
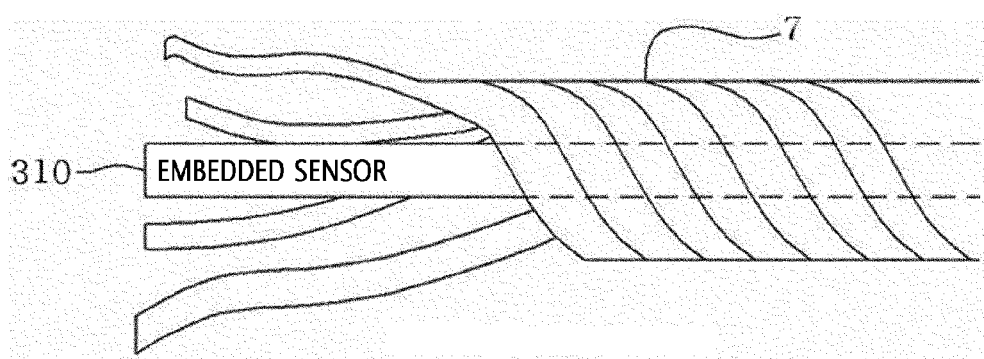
FIG. 13A is a diagram showing an embedded sensor formed in the mooring line of FIG. 11*a*.
Figure 13B:
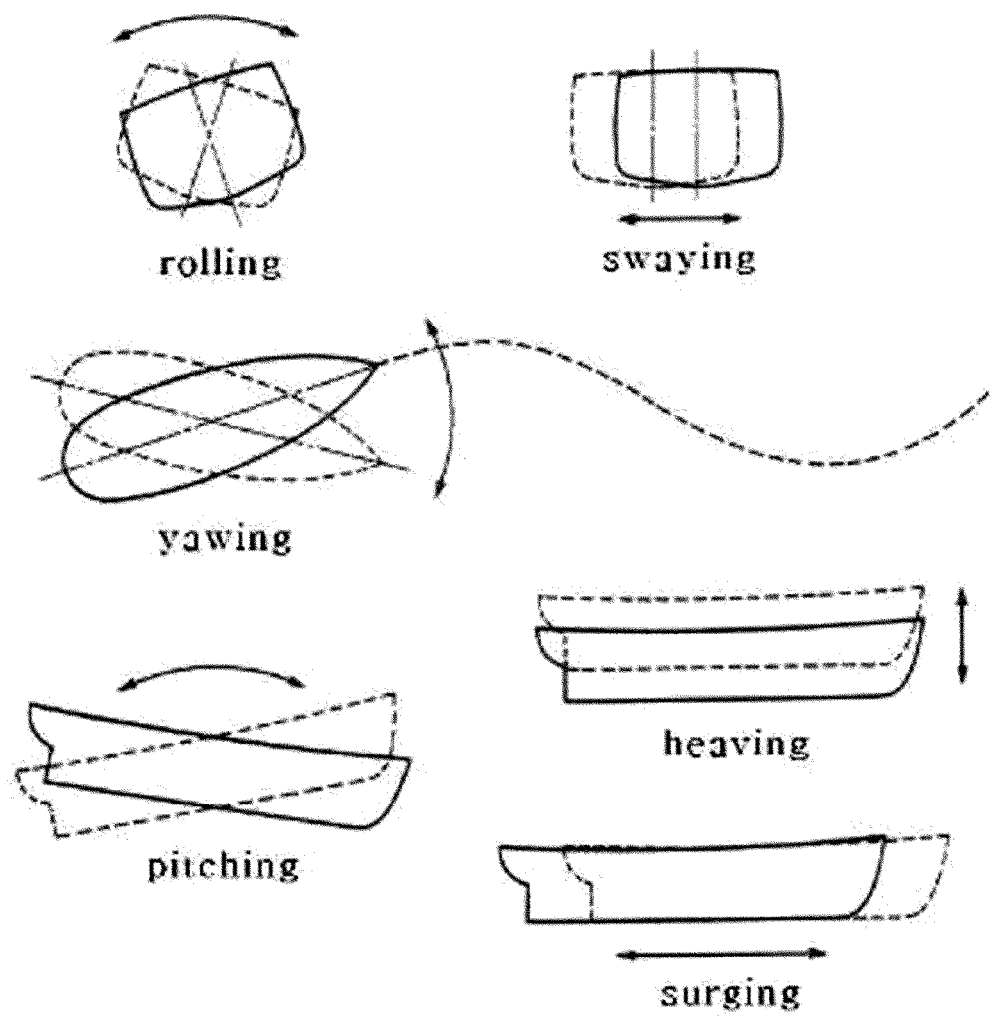
FIG. 13B is a diagram showing 6-dof movement of a marine structure.

System for Static and Dynamic Positioning or Motion Control of a Marine Structure by Using Real-Time Monitoring of at Least One of a Mooring Line, Marine Environments, 6-Dof Movement of a Marine Structure, a Tank State, a Ship Topside, the Seabed, or their Combinations FIG. 10 is a diagram showing surrounding environments of a marine structure to which the present disclosure is applied, FIGS. 11A to 11F are block diagrams showing a system for static and dynamic positioning or motion control of a marine structure by real-time monitoring of a mooring line, marine environments, 6-dof movement of a marine structure, a tank state, a ship topside or the seabed according to the present disclosure, FIG. 12 is a block diagram showing a peripheral configuration connected to a processor unit depicted in FIGS. 11A to 11F, FIG. 13A is a diagram showing an embedded sensor formed in the mooring line of FIG. 11A, and FIG. 13B is a diagram showing 6-dof movement of a marine structure.

Referring to FIGS. 10, 11A to 11F, 12, 13A and 13B, a system for static and dynamic positioning or motion control of a marine structure by using real-time monitoring of a mooring line, marine environments, 6-dof movement of a marine structure, a tank state, a ship topside or the seabed according to the present disclosure includes a processor unit 100, a light sensor measuring unit 200*a* to 200*f* configured to operate for a mooring line, marine environments, 6-dof movement of a marine structure, a tank state, a ship topside or the seabed, a data measuring unit 300*a* to 300*f* configured to operate for a mooring line, marine environments, 6-dof movement of a marine structure, a tank state, a ship topside or the seabed, an external equipment connecting unit 400, and a time information synchronous connecting unit 500.

Meanwhile, the marine structure applied in the present disclosure may adopt any kind of large-sized marine structure such as a fixed structure, a semisubmersible structure, a marine structure, a floating structure and/or a submerging structure, and for example FPSO, F-LNG, LNGC, drilling ships, wind power generating turbines or the like may be applied. However, the present disclosure is not limited to the kind of the marine structure.

The marine structure 1 has a rotary screw-type or tri locking system at an end of an umbilical cable 6 or a pipe to be connected to a sub-tree structure 2 at the seabed, and is also connected from the seabed stratum to an emergency shutdown valve at a lower portion of the FPSO through a riser 5. In addition, if the marine structure 1 is a marine floating structure such as FPSO, a mooring line 7 for fixing the marine floating structure onto the seabed surface and a riser 5 for drilling crude oil, and on the sea, a carrier 3 for carrying the crude oil is connected to the FPSO 1 by means of an offload transfer pipe line 4.

The processor unit 100 includes an algorithm controlling processor 600, a motor-driving and hydraulic-driving unit 700 and a motor and hydraulic device 900. The algorithm controlling processor 600 controls a motor and hydraulic device 900 such as an anchoring winch 910 and a rotary turret 920 by using a previously stored control algorithm. The motor-driving and hydraulic-driving unit 700 is operated by the algorithm controlling processor 600. The motor and hydraulic device 900 is operated by the motor-driving and hydraulic-driving unit 700. In addition, the processor unit 100 includes a signal transmitting/receiving unit 800 to transmit a control command from the processor unit 100 to the algorithm controlling processor 600 or receive driving information of the motor and hydraulic device 900 from the algorithm controlling processor 600. The signal transmitting/receiving unit 800 may adopt a communication means such as RS232, RS485, CAN, TCP/IP or the like, or an optical modem or ultrasonic/sonic sonar for implementing the same.

The light sensor measuring unit 200a to 200f for a mooring line, marine environments, 6-dof movement of a marine structure, a tank state, a ship topside or the seabed may include an optical fiber inserted therein or one or more optical fiber Bragg grating sensors (FBG). The optical fiber Bragg grating sensor is used for structural safety monitoring with better sensitivity in comparison to an existing strain gauge and has no risk of explosion due to a reaction with LNG or the like since it uses an optical signal and thus is not influenced by an electromagnetic field. The sensing signal of the optical fiber Bragg grating sensor is transferred to the processor unit 100 in real time.

In addition, the light sensor measuring unit 200a to 200f for a mooring line, marine environments, 6-dof movement of a marine structure, a tank state, a ship topside or the seabed respectively operates independently from the data measuring unit 300a to 300f for a mooring line, marine environments, 6-dof movement of a marine structure, a tank state, a ship topside or the seabed, and data measured by the light sensor measuring unit 200a to 200f for a mooring line, marine environments, 6-dof movement of a marine structure, a tank state, a ship topside or the seabed and the data measuring unit 300a to 300f for a mooring line, marine environments, 6-dof movement of a marine structure, a tank state, a ship topside or the seabed may be continuously monitored by means of an optical measuring solution such as optical time-domain reflectometer (OTDR), Raman, Boullian, Rayleigh, distributed acoustic sensing (DAS), acoustic emission, inteferometric, or their combinations.

In other words, sensor volumes and time tags measured by the light sensor measuring unit 200a to 200f for a mooring line, marine environments, 6-dof movement of a marine structure, a tank state, a ship topside or the seabed and the data measuring unit 300a to 300f for a mooring line, marine environments, 6-dof movement of a marine structure, a tank state, a ship topside or the seabed are transmitted by means of a post-processing, and at this time, paths of transmitted optical signals, radar signals in the air and sonar signals in water are corrected by means of an optical measuring solution including OTDR, Raman, Boullian, Rayleigh, DAS, acoustic emission, inteferometric, or their combinations.

Here, the optical measuring solution including OTDR, Raman, Boullian, Rayleigh, DAS, acoustic emission, inteferometric, or their combinations uses a phenomenon in which when a pulse light is incident into an optical fiber and then the optical fiber is extended or bent due to an external stimulation, the optical loss increases as much. By using this, a state of an underwater structure may be continuously monitored. Though not shown in the figures, the light sensor measuring unit 200a to 200f for a mooring line, marine environments, 6-dof movement of a marine structure, a tank state, a ship topside or the seabed may further include a digital-analog converter, an internal variable light source, an optical coupler, a photodiode and analog-digital converter.

In addition, in order to figure out an accurate time of the measured data by using an internationally standardized communication protocol having time information, time information supported by the GPS, Gyro and SONAR module is used to store the data together with standard time of each country so that the stored data is used as a synchronized measurement data at analysis. This may be an important element technology when various kinds of sensor measurement devices and data are shared.

Meanwhile, the mooring line light sensor measuring unit 200a senses a change of tension of the mooring line 7 and may be installed in or out of the mooring line 7. Therefore, in the present disclosure, the change of tensile force, namely tension, of the mooring line 7 may be more accurately and precisely measured by means of the mooring line light sensor measuring unit 200a (and/or mooring line data measuring unit 300a) installed at the mooring line 7, and further a necessary safety distance of a carrier in a marine storage place such as F-LNG and FPSO may be maintained by winding or releasing a rope wire (not shown) rolled around a motor winch 910 connected to the mooring line 7 by operating the motor winch 910. Moreover, in the present disclosure, an optical fiber Bragg grating sensor having a longer life span than the mooring line 7 may be used, different from an existing electric sensor, and thus it is possible to ensure durability of the sensors longer than the life span of the mooring line 7.

In addition, the marine environment light sensor measuring unit 200b may be installed in or out of the marine structure to measure marine environment data about at least one of wind direction, wind speed, air humidity, atmospheric pressure, atmosphere temperature, cloud height, visibility, ocean wave, wave height, sea current speed, sea current direction, and rain in real time, and the processor unit 100 may maintain a necessary safety distance of a carrier in a marine storage place such as F-LNG and FPSO by winding or releasing a rope wire (not shown) rolled around the motor winch 910 connected to the mooring line 7 by operating the motor winch 910 according to the measured marine environment data. Moreover, in the present disclosure, an optical fiber Bragg grating sensor having a longer life span than the mooring line 7 may be used, different from an existing electric sensor, and thus it is possible to ensure durability of the sensors longer than the life span of the mooring line 7.

Meanwhile, the marine structure light sensor measuring unit 200c may be installed in or out of the marine structure to measure 6-dof movement of the marine structure in real time, and the processor unit 100 may maintain a necessary safety distance of a carrier in a marine storage place such as F-LNG and FPSO by winding or releasing a rope wire (not shown) rolled around the motor winch 910 connected to the mooring line 7 by operating the motor winch 910 according to the measured 6-dof movement data of the marine structure. Moreover, in the present disclosure, an optical fiber Bragg grating sensor having a longer life span than the mooring line 7 may be used, different from an existing electric sensor, and thus it is possible to ensure durability of the sensors longer than the life span of the mooring line 7.

Meanwhile, the tank state light sensor measuring unit 200*d* may be installed in or out of the marine structure to measure ullage and sloshing data of various tanks such as LNG, ballast, cargo-oil tank or the like in the marine structure in real time, and the processor unit 100 may maintain a necessary safety distance of a carrier in a marine storage place such as F-LNG and FPSO by winding or releasing a rope wire (not shown) rolled around the motor winch 910 connected to the mooring line 7 by operating the motor winch 910 according to the measured ullage and sloshing data of various tanks in the marine structure. Moreover, in the present disclosure, an optical fiber Bragg grating sensor having a longer life span than the mooring line 7 may be used, different from an existing electric sensor, and thus it is possible to ensure durability of the sensors longer than the life span of the mooring line 7.

Meanwhile, the ship topside light sensor measuring unit 200*e* may be installed in or out of the marine structure to measure damage and life of pipes, facilities or the like located at a ship topside of the marine structure in real time, and the processor unit 100 may maintain a necessary safety distance of a carrier in a marine storage place such as F-LNG and FPSO by winding or releasing a rope wire (not shown) rolled around the motor winch 910 connected to the mooring line 7 by operating the motor winch 910 according to the measured damage and life of pipes, facilities or the like. Moreover, in the present disclosure, an optical fiber Bragg grating sensor having a longer life span than the mooring line 7 may be used, different from an existing electric sensor, and thus it is possible to ensure durability of the sensors longer than the life span of the mooring line 7.

Meanwhile, the seabed light sensor measuring unit 200*f* may be installed in or out of the marine structure to measure damage and life of umbilical cables, pipes, pumps and valves below the water surface of the marine structure, namely at the seabed, in real time, and the processor unit 100 may maintain a necessary safety distance of a carrier in a marine storage place such as F-LNG and FPSO by winding or releasing a rope wire (not shown) rolled around the motor winch 910 connected to the mooring line 7 by operating the motor winch 910 according to the measured damage and life of umbilical cables, pipes, pumps and valves. Moreover, in the present disclosure, an optical fiber Bragg grating sensor having a longer life span than the mooring line 7 may be used, different from an existing electric sensor, and thus it is possible to ensure durability of the sensors longer than the life span of the mooring line 7.

The mooring line data measuring unit 300*a* also senses a change of tension of the mooring line 7 like the mooring line light sensor measuring unit 200*a*. The mooring line data measuring unit 300*a* includes an embedded sensor 310 formed in the mooring line 7 and an electric measurement sensor 320 formed at a part of the outer side of the mooring line 7. The embedded sensor 310 or the electric measurement sensor 320 may include a strain sensor, an electric LVDT sensor, a temperature sensor, an electric inertial measurement sensor (IMU), a 2D laser sensor, an ultrasonic displacement sensor, an underwater ultrasonic interval detection sensor or the like. Here, the strain sensor and the temperature sensor may be implemented in an electric or optical form. In this case, the embedded sensor 310 or the electric measurement sensor 320 may further include an optical load cell, a 3D accelerometer and an angle meter.

The marine environment data measuring unit 300*b* is an electric sensor measurement unit. The marine environment data measuring unit 300*b* also measures marine environment data about at least one of wind direction, wind speed, air humidity, atmospheric pressure, atmosphere temperature, cloud height, visibility, ocean wave, wave height, sea current speed, sea current direction, and rain, similar to the marine environment light sensor measuring unit 200*b*. For measuring marine environment data, the marine environment data measuring unit 300*b* includes at least one sensor device among a weathervane/anemometer, a thermometer, a hygrometer, a pressure sensor, a ceilometer, a visibility meter, a sea current direction/speed meter, a wave height meter/ocean wave gauge, a rainfall meter, and a densitometer. Further, the marine environment data measuring unit 300*b* may be any kind of sensor device for measuring aerodynamic and hydrodynamic characteristics of marine environments, and may use a satellite. Meanwhile, the marine environment data measuring unit 300*b* associates location data calculated by DGPS or local GPS attached to a float or the like with the marine environment data. The sensed information and other information obtained by the GPS, Gyro and SONAR module, explained later, are associated with each other based on time by the processor unit 100, and since the motor winch 910 is controlled by using the information, it is possible to pull or release the mooring line 7 connected to the motor winch 710 for the purpose of stabilization.

Meanwhile, the marine structure data measuring unit 300*c* also measures 6-dof movement of the marine structure in real time, similar to the marine structure light sensor measuring unit 200*c*. The marine structure data measuring unit 300*c* includes at least one of an angle meter, an acceleration sensor, a strain sensor, as pressure sensor, an inertia sensor (or, an inertial measurement unit: IMU), and an extensionmeter. Here, the sensor may be implemented electrically or optically.

Meanwhile, the tank state data measuring unit 300*d* also measures ullage and sloshing data of various tanks such as LNG, ballast, cargo-oil tank or the like in the marine structure in real time, similar to the tank state light sensor measuring unit 200*d*. The tank state data measuring unit 300*d* includes various kinds of sensors such as a strain sensor, a temperature sensor, an acceleration sensor and a pressure sensor in order to measure ullage and sloshing data of various tanks. Here, the sensor may be implemented electrically or optically.

Meanwhile, the ship topside data measuring unit 300*e* also measures damage and life of pipes, facilities or the like located at the marine structure, for example at a ship topside, in real time, similar to the ship topside light sensor measuring unit 200*e*. The ship topside data measuring unit 300*e* includes various kinds of sensors such as a strain sensor, a temperature sensor, an acceleration sensor, a pressure sensor and a life span sensor in order to measure damage and life of pipes, facilities or the like. Here, the sensor may be implemented electrically or optically.

Meanwhile, the seabed data measuring unit 300*f* also measures damage and life of umbilical cables, pipes, pumps and valves located at the seabed, similar to the seabed light sensor measuring unit 200*f*. The seabed data measuring unit 300*f* includes various kinds of sensors such as a strain sensor, a temperature sensor, an acceleration sensor, a pressure sensor and a life span sensor in order to measure damage and life of umbilical cables, pipes, pumps and valves. Here, the sensor may be implemented electrically or optically.

Meanwhile, as shown in FIG. 13a, after the above sensors are formed on a central core line of the mooring line 7, the embedded sensor 310 may be formed to surround the central core line with peripheral lines. Looseness of the mooring line 7 may be predicted by forming various sensors are formed in the mooring line 7 as described above, and by doing so, the change of tension of the mooring line 7 may be sensed.

Meanwhile, according to the present disclosure, sea current and tidal current as well as diastrophism of the seabed may be measured by using the monitoring data of the mooring line. In other words, if direction and strain of a tension applied to the mooring line are measured by utilizing an accelerometer and a strain sensor, direction and velocity of sea current and tidal current may be measured based thereon. In addition, if the mooring line is fixed to the seabed bottom and an accelerometer and an angle meter are installed to the fixed portion to analyze the obtained data, diastrophism may be measured.

The sensed information and the information obtained from the GPS, Gyro and SONAR module, explained later, are associated according to time by the processor unit 100, and if the motor winch 910 is controlled using the information, the mooring line 7 connected to the motor winch 710 is pulled or released for stabilization. Meanwhile, the electric inertial measurement sensor 320 may be used for controlling or sailing the marine structure, and an acceleration sensor, an angular acceleration sensor, a magnetic field sensor or the like of the marine structure may be coupled thereto.

By using coordinate transformation values of various kinds of sensors as described above, it is possible to detect a relative distance variation (or, rolling) between the upper portion and the lower portion (underwater) of the marine structure, lateral shaking (or, yawing) for detecting a relative interval between marine structures, and a relative height variation (or, pitching) according to loading or unloading in the marine structure. These detection values may be utilized as correction information for maintaining stable anchoring of the marine structure. In other words, the processor unit 100 controls a tensile force of the mooring line 7 by driving the motor winch 910 according to the detection values. In addition, according to the present disclosure, eddies in the air and water may also be found by analyzing measurement data about an input angle of a wind direction and an input angle of sea current.

Meanwhile, the data measured by the light sensor measuring unit 200a to 200f for a mooring line, marine environments, 6-dof movement of a marine structure, a tank state, a ship topside or the seabed and the data measuring unit 300a to 300f for a mooring line, marine environments, 6-dof movement of a marine structure, a tank state, a ship topside or the seabed represents static and/or dynamic data with or without a time tag.

The motor winch 910 not only gives a power for pulling or releasing the mooring line 7 by the motor-driving and hydraulic-driving unit 700 but also is connected to a magnetic brake (not shown) to stop the motor winch 910, which rotates due to a rotational inertia after the interruption of a current, within a short time when the motor winch 910 quits its operation.

The data measured by the light sensor measuring unit 200a to 200f for a mooring line, marine environments, 6-dof movement of a marine structure, a tank state, a ship topside or the seabed and the data measuring unit 300a to 300f for a mooring line, marine environments, 6-dof movement of a marine structure, a tank state, a ship topside or the seabed is converted into a digital signal by means of a plurality of analog-digital converters (not shown), and the converted signal is changed into a physical value by the algorithm controlling processor 600. In other words, the algorithm controlling processor 600 changes all signals of the light sensor measuring unit 200a to 200f for a mooring line, marine environments, 6-dof movement of a marine structure, a tank state, a ship topside or the seabed and the data measuring unit 300a to 300f for a mooring line, marine environments, 6-dof movement of a marine structure, a tank state, a ship topside or the seabed. After that, the processor unit 100 pulls or releases the mooring line 7 connected to the motor winch 910 by means of a control algorithm of the algorithm controlling processor 600 by using the changed data, and also controls the rotation of the rotary turret 920.

In this case, particularly, the light sensor measuring unit 200a to 200f for a mooring line, marine environments, 6-dof movement of a marine structure, a tank state, a ship topside or the seabed and the data measuring unit 300a to 300f for a mooring line, marine environments, 6-dof movement of a marine structure, a tank state, a ship topside or the seabed respectively reflect an environmental external force to measure periodic or non-periodic coupled energy and a resultant response vector by using a hydrodynamic or aerodynamic characteristic of: a marine structure 1, a riser 5 and a mooring line 7; marine environment elements such as wind direction, wind speed, air humidity, atmospheric pressure, atmosphere temperature, cloud height, visibility, ocean wave, wave height, sea current speed, sea current direction, rain or the like; a marine structure 1; at least one of LNG, a ballast and a cargo-oil tank in the marine structure; at least one of pipes and facilities located at a ship topside of the marine structure; or at least one of umbilical cables, pipes, pumps and valves located at the seabed. If so, the algorithm controlling processor 600 changes all measurement signals of the light sensor measuring unit 200a to 200f for a mooring line, marine environments, 6-dof movement of a marine structure, a tank state, a ship topside or the seabed and the data measuring unit 300a to 300f for a mooring line, marine environments, 6-dof movement of a marine structure, a tank state, a ship topside or the seabed to analyze structure or behavior of the marine structure 1, and implements a look-up table built as a DB. If so, the processor unit 100 predicts a time delay of the marine structure 1 through the control algorithm of the algorithm controlling processor 600 in advance by using the changed data to attempt controlling of movement (or, motion) of the marine structure 1 in advance, thereby performing optimal static and dynamic positioning or motion control. Therefore, it is possible to suitably cope with even the worst environmental external force condition to perform optimal static and dynamic positioning or motion control to the marine structure. Accordingly, static and dynamic positioning or motion control is also available even when a thruster is used or even when one or more rudders are additionally utilized, and at this time, movement including rolls and pitches may also be minimized.

In relation to the above, in an embodiment of the present disclosure, for optimal static and dynamic positioning or motion control, the mooring line light sensor measuring unit 200a and the mooring line data measuring unit 300a measure a change of regional tension, a fatigue load, an acceleration, an extension, or an inertia between a subsea structure including a wellhead connected to the riser, a blow-out preventer (BOP), or a drill rig and the riser in real time, and the processor unit 100 reflects the measurement value on controlling. In addition, the mooring line light sensor measuring unit 200a and the mooring line data measuring unit 300a measure a change of temperature-compensated strain, acceleration, slant or moment of the embedded sensor 310 and the electric measurement sensor 320 formed at the mooring line 7 in real time, and the processor unit 100 reflects the measurement value on controlling. In addition, the mooring line light sensor measuring unit 200a and the mooring line data measuring unit 300a measure a change of tension of a Hauser line for off-loading oil, and the processor unit 100 provides the measurement value to a liquefied natural gas carrier (LNGC), a tanker, an unmanned undersea vehicle (ROV), a platform supply vessel (PSV) or the like to perform optimal static and dynamic positioning or motion control to the marine structure 1. In addition, the processor unit 100 adjusts the balance of the marine structure and minimizes 6-dof movement by adjusting water in a ballast tank of the marine structure 1 and setting a rudder direction (passive/semi-active control).

In relation to the above, in an embodiment of the present disclosure, for optimal static and dynamic positioning or motion control, the processor unit 100 adjusts the balance of the marine structure and minimizes 6-dof movement by adjusting water in a ballast tank of the marine structure 1 and setting a rudder direction (passive/semi-active control).

In addition, relation to the above, in an embodiment of the present disclosure, for optimal static and dynamic positioning or motion control, the processor unit 100 adjusts the balance of the marine structure and minimizes 6-dof movement by adjusting water in a ballast tank of the marine structure 1 and setting a rudder direction (passive/semi-active control).

Meanwhile, the external equipment connecting unit 400 includes a trigger input/output device 410 connected to the processor unit 100. The trigger input/output device 410 includes input and output terminals (not shown) for transmitting or receiving a trigger signal and a sampling signal, and samples the light sensor measuring unit 200a to 200f for a mooring line, marine environments, 6-dof movement of a marine structure, a tank state, a ship topside or the seabed and the data measuring unit 300a to 300f for a mooring line, marine environments, 6-dof movement of a marine structure, a tank state, a ship topside or the seabed at the same time and matches data sensed at the same time when analyzing the data measured by measurement devices so that the processor unit 100 may synchronize measurements of the measurement devices.

In addition, the time information synchronous connecting unit 500 includes implements a global positioning system (GPS), gyroscope (Gyro) and sound navigation and ranging (SONAR) module 510 connected to the processor unit 100 to implement a mutual synchronization function for the data sensed by the light sensor measuring unit 200a to 200f for a mooring line, marine environments, 6-dof movement of a marine structure, a tank state, a ship topside or the seabed and the data measuring unit 300a to 300f for a mooring line, marine environments, 6-dof movement of a marine structure, a tank state, a ship topside or the seabed as well as data such as a location, equilibrium state, underwater sound or the like of the marine structure by using the GPS, Gyro and SONAR module, so that the light sensor measuring unit 200a to 200f for a mooring line, marine environments, 6-dof movement of a marine structure, a tank state, a ship topside or the seabed and the data measuring unit 300a to 300f for a mooring line, marine environments, 6-dof movement of a marine structure, a tank state, a ship topside or the seabed are respectively synchronized with each other.

Therefore, in the present disclosure, all of the above functions may be integrated in the processor unit 100, and the processor unit 100 may display complicated data in a graphic form through a monitor as well as stores on a hard disk or print all data. In addition, the processor unit 100 may minimize an external force applied to facilities connected to the mooring line 7 of the marine structure by collecting and utilizing the data measured by the light sensor measuring unit 200a to 200f for a mooring line, marine environments, 6-dof movement of a marine structure, a tank state, a ship topside or the seabed and the data measuring unit 300a to 300f for a mooring line, marine environments, 6-dof movement of a marine structure, a tank state, a ship topside or the seabed. In addition, the processor unit 100 may also maintain a safety distance of a carrier by utilizing information collected from a marine storage place (e.g., F-LNG and FPSO) and/or the carrier which predicts a geographic location.

Meanwhile, in the present disclosure, at least one power supply unit 20 for connecting a power source of each of the processor unit 100, the light sensor measuring unit 200a to 200f for a mooring line, marine environments, 6-dof movement of a marine structure, a tank state, a ship topside or the seabed, the data measuring unit 300a to 300f for a mooring line, marine environments, 6-dof movement of a marine structure, a tank state, a ship topside or the seabed and the motor and hydraulic device 900 may be further provided to operate the processor unit 100, the light sensor measuring unit 200a to 200f for a mooring line, marine environments, 6-dof movement of a marine structure, a tank state, a ship topside or the seabed, the data measuring unit 300a to 300f for a mooring line, marine environments, 6-dof movement of a marine structure, a tank state, a ship topside or the seabed and the motor and hydraulic device 900. For example, a first power supply unit for supplying a motor-driving power (AC 220V) to the motor winch 910 among external control devices such as the motor and hydraulic device 900, a second power supply unit for supplying a driving power (DC 24V) to the processor unit 100, and a third power supply unit for supplying a driving power (DC 12V) to the light sensor measuring unit 200a to 200f for a mooring line, marine environments, 6-dof movement of a marine structure, a tank state, a ship topside or the seabed and the data measuring unit 300a to 300f for a mooring line, marine environments, 6-dof movement of a marine structure, a tank state, a ship topside or the seabed. However, in the present disclosure, the kind of powers supplied from the power supply unit 20 and the number of installed power supply units 20 are not limited.

Method for Static and Dynamic Positioning or Motion Control of a Marine Structure Using Real-Time Monitoring of at Least One a Mooring Line, Marine Environments, 6-Dof Movement of a Marine Structure, a Tank State, a Ship Topside, the Seabed, or their Combinations The present disclosure also provides a method for static and dynamic positioning or motion control of a marine structure by using real-time monitoring of at least one of a mooring line, marine environments, 6-dof movement of a marine structure, a tank state, a ship topside, the seabed, or their combinations, which is implemented on a system for static and dynamic positioning or motion control of a marine structure by using real-time monitoring of a mooring line. The method of the present disclosure will be described in detail stage by stage. In this case, in the description of the present disclosure, any feature or function already explained above may be omitted.

First stage: the light sensor measuring unit 200*a* to 200*f* for a mooring line, marine environments, 6-dof movement of a marine structure, a tank state, a ship topside or the seabed and the data measuring unit 300*a* to 300*f* for a mooring line, marine environments, 6-dof movement of a marine structure, a tank state, a ship topside or the seabed senses in real time: a change of tension of the mooring line 7; marine environment data about at least one of wind direction, wind speed, air humidity, atmospheric pressure, atmosphere temperature, cloud height, visibility, ocean wave, wave height, sea current speed, sea current direction and rain; 6-dof movement of the marine structure; ullage and sloshing data of a tank loaded in the marine structure; damage and life of at least one of pipes and facilities located at a ship topside of the marine structure; or damage and life of at least one of umbilical cables, pipes, pumps and valves located on the seabed. In this case, the data measured by the light sensor measuring unit 200*a* to 200*f* for a mooring line, marine environments, 6-dof movement of a marine structure, a tank state, a ship topside or the seabed and the data measuring unit 300*a* to 300*f* for a mooring line, marine environments, 6-dof movement of a marine structure, a tank state, a ship topside or the seabed is static or dynamic data with or without a time tag.

Second stage: the external equipment connecting unit 400 samples the light sensor measuring unit 200*a* to 200*f* for a mooring line, marine environments, 6-dof movement of a marine structure, a tank state, a ship topside or the seabed and the data measuring unit 300*a* to 300*f* for a mooring line, marine environments, 6-dof movement of a marine structure, a tank state, a ship topside or the seabed at the same time and matches data sensed at the same time when analyzing the data measured by measurement devices.

Third stage: the time information synchronous connecting unit 500 implements a mutual synchronization function for the data sensed by the light sensor measuring unit 200*a* to 200*f* for a mooring line, marine environments, 6-dof movement of a marine structure, a tank state, a ship topside or the seabed and the data measuring unit 300*a* to 300*f* for a mooring line, marine environments, 6-dof movement of a marine structure, a tank state, a ship topside or the seabed by using the GPS, gyro and sonar module.

Fourth stage: the processor unit 100 tightens or loosens the mooring line 7 connected to the motor winch 910 according to a control algorithm of the algorithm controlling processor 600 by using data measured by the light sensor measuring unit 200*a* to 200*f* for a mooring line, marine environments, 6-dof movement of a marine structure, a tank state, a ship topside or the seabed, the data measuring unit 300*a* to 300*f* for a mooring line, marine environments, 6-dof movement of a marine structure, a tank state, a ship topside or the seabed, and controls rotation of the rotary turret 920.

For this, the processor unit 100 converts the signals measured by the light sensor measuring unit 200*a* to 200*f* for a mooring line, marine environments, 6-dof movement of a marine structure, a tank state, a ship topside or the seabed and the data measuring unit 300*a* to 300*f* for a mooring line, marine environments, 6-dof movement of a marine structure, a tank state, a ship topside or the seabed into a digital signal by means of a plurality of analog-digital converter, and the algorithm controlling processor 600 changes the converted signal into a physical value.

In this case, the data measured by the light sensor measuring unit 200*a* to 200*f* for a mooring line, marine environments, 6-dof movement of a marine structure, a tank state, a ship topside or the seabed and the data measuring unit 300*a* to 300*f* for a mooring line, marine environments, 6-dof movement of a marine structure, a tank state, a ship topside or the seabed is processed by means of an optical measuring solution including OTDR, Raman, Boullian, Rayleigh, DAS, acoustic emission, inteferometric, or their combinations.

In this stage, the processor unit 100 displays the data measured by the light sensor measuring unit 200*a* to 200*f* for a mooring line, marine environments, 6-dof movement of a marine structure, a tank state, a ship topside or the seabed and the data measuring unit 300*a* to 300*f* for a mooring line, marine environments, 6-dof movement of a marine structure, a tank state, a ship topside or the seabed in a graphic form through a monitor, or stores the measured data on a hard disk or print the data.

In addition, in this stage, the processor unit 100 minimizes an external force applied to facilities connected to the mooring line 7 of the marine structure by collecting and utilizing the data measured by the light sensor measuring unit 200*a* to 200*f* for a mooring line, marine environments, 6-dof movement of a marine structure, a tank state, a ship topside or the seabed and the data measuring unit 300*a* to 300*f* for a mooring line, marine environments, 6-dof movement of a marine structure, a tank state, a ship topside or the seabed.

The above description is just illustration of the present disclosure, and various changes, modifications and replacements may be added thereto without departing from the essence of the present disclosure by those skilled in the art. Therefore, the embodiments of the present disclosure and the accompanying drawings are not intended to limit the technical spirit of the present disclosure but to give an explanation, and the scope of the present disclosure is not limited by the embodiments and the accompanying drawings. The scope of the present disclosure should be defined by the appended claims, and all equivalents should be interpreted as falling within the scope of the present disclosure.

What is claimed is:

1. A system for static and dynamic positioning or motion control of a marine structure by using real-time monitoring of at least one of a mooring line, marine environments, 6 degrees of freedom (6-dof) movement of a marine structure, a tank state, a ship topside, the seabed, or their combinations, the system comprising:
   a processor unit having at least one interface;
   a light sensor measuring unit connected to the processor unit to operate for at least one of a mooring line, marine environments, 6-dof movement of a marine structure, a tank state, a ship topside, the seabed, or their combinations;
   a data measuring unit connected to the processor unit to operate for at least one of a mooring line, marine environments, 6-dof movement of a marine structure, a tank state, a ship topside, the seabed, or their combinations;
   an external equipment connecting unit connected to the processor unit; and
   a time information synchronous connecting unit connected to the processor unit,
   wherein the processor unit tightens or loosens a mooring line connected to a motor winch according to a previously stored control algorithm by using data measured by the light sensor measuring unit and the data measuring unit and controls rotation of a rotary turret, and wherein the time information synchronous connecting unit includes a global positioning system (GPS), gyroscope (Gyro) and sound navigation and ranging (SONAR) module connected to the processor unit to implement a mutual synchronization function for the data sensed by the light sensor measuring unit and the data measuring unit by using the GPS, Gyro and SONAR module, so that the light sensor measuring unit and the data measuring unit are synchronized.

2. The system for static and dynamic positioning or motion control of a marine structure by using real-time monitoring of at least one of a mooring line, marine environments, 6-dof movement of a marine structure, a tank state, a ship topside, the seabed, or their combinations according to claim 1, wherein the processor unit includes:
an algorithm controlling processor configured to control a motor and hydraulic device by using a previously stored control algorithm;
a motor-driving and hydraulic-driving unit operated by the algorithm controlling processor;
a motor and hydraulic device operated by the motor-driving and hydraulic-driving unit; and
a signal transmitting/receiving unit configured to transmit a control command from the processor unit to the algorithm controlling processor or receive driving information from the algorithm controlling processor to the motor and hydraulic device,
wherein the motor and hydraulic device includes a motor winch and a rotary turret.

3. The system for static and dynamic positioning or motion control of a marine structure by using real-time monitoring of at least one of a mooring line, marine environments, 6-dof movement of a marine structure, a tank state, a ship topside, the seabed, or their combinations according to claim 2, wherein the light sensor measuring unit and the data measuring unit measures or senses in real time at least one or a combination of:
change of tension of the mooring line;
marine environment data about at least one of wind direction, wind speed, air humidity, atmospheric pressure, atmosphere temperature, cloud height, visibility, ocean wave, wave height, sea current speed, sea current direction and rain;
6-dof movement of the marine structure;
ullage and sloshing data of a tank loaded in the marine structure;
damage and life of at least one of pipes and facilities located at a ship topside of the marine structure; and
damage and life of at least one of umbilical cables, pipes, pumps and valves located on the seabed.

4. The system for static and dynamic positioning or motion control of a marine structure by using real-time monitoring of at least one of a mooring line, marine environments, 6-dof movement of a marine structure, a tank state, a ship topside, the seabed, or their combinations according to claim 2,
wherein the data measuring unit includes at least one or a combination of:
an embedded sensor formed in the mooring line and an electric measurement sensor formed at a part of an outer side of the mooring line;
at least one sensor device selected from a weathervane/anemometer, an atmosphere temperature/hygrometer, an atmosphere pressure sensor, a ceilometer, a visibility meter, a sea current direction/speed meter, a wave height meter/ocean wave gauge, and a rainfall meter;
at least one of an angle meter, an acceleration sensor, a strain sensor, a pressure sensor, an inertia sensor (IMU), and an extension-meter; and
at least one of a strain sensor, a temperature sensor, an acceleration sensor, and a pressure sensor.

5. The system for static and dynamic positioning or motion control of a marine structure by using real-time monitoring of a mooring line according to claim 4,
wherein the data measuring unit includes the embedded sensor and the electric measurement sensor, and
wherein the embedded sensor has sensors formed on a central core line of the mooring line, and the central core line is formed to surround peripheral lines.

6. The system for static and dynamic positioning or motion control of a marine structure by using real-time monitoring of at least one of a mooring line, marine environments, 6-dof movement of a marine structure, a tank state, a ship topside, the seabed, or their combinations according to claim 4,
wherein the data measuring unit includes the embedded sensor and the electric measurement sensor, and
wherein the embedded sensor or the electric measurement sensor includes at least one of a strain sensor, an electric LVDT sensor, a temperature sensor, an electric inertial measurement sensor (IMU), a 2D laser sensor, an ultrasonic displacement sensor, and underwater ultrasonic interval detection sensor.

7. The system for static and dynamic positioning or motion control of a marine structure by using real-time monitoring of at least one of a mooring line, marine environments, 6-dof movement of a marine structure, a tank state, a ship topside, the seabed, or their combinations according to claim 6,
wherein the embedded sensor or the electric measurement sensor includes the strain sensor and the temperature sensor, and
wherein the strain sensor and the temperature sensor are implemented electrically or optically.

8. The system for static and dynamic positioning or motion control of a marine structure by using real-time monitoring of at least one of a mooring line, marine environments, 6-dof movement of a marine structure, a tank state, a ship topside, the seabed, or their combinations according to claim 6,
wherein the embedded sensor or the electric measurement sensor further includes an optical load cell, a 3D acceleration meter and an angle meter.

9. The system for static and dynamic positioning or motion control of a marine structure by using real-time monitoring of at least one of a mooring line, marine environments, 6-dof movement of a marine structure, a tank state, a ship topside, the seabed, or their combinations according to claim 2,
wherein the processor unit converts a signal measured by the light sensor measuring unit and the data measuring unit into a digital signal through a plurality of analog-digital converters, and the algorithm controlling processor changes the converted signal into a physical value.

10. The system for static and dynamic positioning or motion control of a marine structure by using real-time monitoring of at least one of a mooring line, marine environments, 6-dof movement of a marine structure, a tank state, a ship topside, the seabed, or their combinations according to claim 9,
wherein the light sensor measuring unit and the data measuring unit measure periodic or non-periodic coupled energy and a resultant response vector by using at least one hydrodynamic or aerodynamic characteristic of at least one or a combination of:
a marine structure, a riser and a mooring line to which an environmental external force is reflected;
marine environment elements selected from wind direction, wind speed, air humidity, atmospheric pressure, atmosphere temperature, cloud height, visibility, ocean wave, wave height, sea current speed, sea current direction, and rain;
a marine structure;
at least one of umbilical cables, pipes, pumps and valves located at the seabed;
at least one of pipes and facilities located at a ship topside of the marine structure; and
at least one of umbilical cables, pipes, pumps and valves located at the seabed.

11. The system for static and dynamic positioning or motion control of a marine structure by using real-time monitoring of at least one of a mooring line, marine environments, 6-dof movement of a marine structure, a tank state, a ship topside, the seabed, or their combinations according to claim 10,
wherein the algorithm controlling processor changes all measurement signals of the light sensor measuring unit and the data measuring unit to analyze a structure or behavior of the marine structure and make a look-up table built as a database.

12. The system for static and dynamic positioning or motion control of a marine structure by using real-time monitoring of at least one of a mooring line, marine environments, 6-dof movement of a marine structure, a tank state, a ship topside, the seabed, or their combinations according to claim 11,
wherein the processor unit predicts a time delay of the marine structure through the control algorithm of the algorithm controlling processor in advance by using the look-up table to attempt controlling of movement of the marine structure in advance.

13. The system for static and dynamic positioning or motion control of a marine structure by using real-time monitoring of at least one of a mooring line, marine environments, 6-dof movement of a marine structure, a tank state, a ship topside, the seabed, or their combinations according to claim 12,
wherein the processor unit adjusts the balance of the marine structure and minimizes 6-dof movement by adjusting water in a ballast tank of the marine structure and setting a rudder direction (passive/semi-active control).

14. The system for static and dynamic positioning or motion control of a marine structure by using real-time monitoring of at least one of a mooring line, marine environments, 6-dof movement of a marine structure, a tank state, a ship topside, the seabed, or their combinations according to claim 9,
wherein the light sensor measuring unit for a mooring line and the data measuring unit for a mooring line measures a change of regional tension, a fatigue load, an acceleration, an extension, or an inertia between a subsea structure including a wellhead connected to the riser, a blow-out preventer (BOP), or a drill rig and the riser in real time, and the processor unit reflects the measurement value on controlling.

15. The system for static and dynamic positioning or motion control of a marine structure by using real-time monitoring of at least one of a mooring line, marine environments, 6-dof movement of a marine structure, a tank state, a ship topside, the seabed, or their combinations according to claim 9,
wherein the light sensor measuring unit for a mooring line and the data measuring unit for a mooring line measures a change of moment of the embedded sensor and the electric measurement sensor formed at the mooring line in real time, and the processor unit reflects the measurement value on controlling.

16. The system for static and dynamic positioning or motion control of a marine structure by using real-time monitoring of at least one of a mooring line, marine environments, 6-dof movement of a marine structure, a tank state, a ship topside, the seabed, or their combinations according to claim 9,
wherein the light sensor measuring unit for a mooring line and the data measuring unit for a mooring line measures a change of tension of a Hauser line for off-loading oil, and the processor unit provides the measurement value to at least one of a liquefied natural gas carrier (LNGC), a tanker, an unmanned undersea vehicle (ROV) and a platform supply vessel (PSV) to perform optimal static and dynamic positioning or motion control to the marine structure.

17. The system for static and dynamic positioning or motion control of a marine structure by using real-time monitoring of at least one of a mooring line, marine environments, 6-dof movement of a marine structure, a tank state, a ship topside, the seabed, or their combinations according to claim 2,
wherein the light sensor measuring unit has an optical fiber inserted therein or includes at least one optical fiber Bragg grating sensor (FBG).

18. The system for static and dynamic positioning or motion control of a marine structure by using real-time monitoring of at least one of a mooring line, marine environments, 6-dof movement of a marine structure, a tank state, a ship topside, the seabed, or their combinations according to claim 17,
wherein the light sensor measuring unit operates independently from the data measuring unit, and
wherein the data measured by the light sensor measuring unit and the data measuring unit are processed by means of an optical measuring solution including optical time-domain reflectometer (OTDR), Raman, Boullian, Rayleigh, distributed acoustic sensing (DAS), acoustic emission, inteferometric, or their combinations.

19. The system for static and dynamic positioning or motion control of a marine structure by using real-time monitoring of at least one of a mooring line, marine environments, 6-dof movement of a marine structure, a tank state, a ship topside, the seabed, or their combinations according to claim 2, further comprising:
at least one power supply unit for connecting a power source of each of the processor unit, the light sensor measuring unit, the data measuring unit and the motor and hydraulic device.

* * * * *